US010455358B2

(12) United States Patent
Ouyang et al.

(10) Patent No.: US 10,455,358 B2
(45) Date of Patent: *Oct. 22, 2019

(54) PROSE INFORMATION TRANSMISSION METHOD, TERMINAL, AND COMMUNICATIONS DEVICE

(71) Applicant: HUAWEI TECHNOLOGIES CO., LTD., Shenzhen (CN)

(72) Inventors: Guowei Ouyang, Beijing (CN); Hui Jin, Beijing (CN); Qiang Yi, Beijing (CN); Yue He, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 15/816,659

(22) Filed: Nov. 17, 2017

(65) Prior Publication Data

US 2018/0091944 A1    Mar. 29, 2018

Related U.S. Application Data

(63) Continuation of application No. 15/303,406, filed as application No. PCT/CN2014/085616 on Aug. 29, 2014, now Pat. No. 9,854,399.

(30) Foreign Application Priority Data

Jun. 30, 2014 (WO) ................ PCT/CN2014/081292

(51) Int. Cl.
*H04W 4/02* (2018.01)
*H04W 48/16* (2009.01)
(Continued)

(52) U.S. Cl.
CPC .......... *H04W 4/023* (2013.01); *H04L 67/303* (2013.01); *H04W 4/06* (2013.01); *H04W 8/005* (2013.01);
(Continued)

(58) Field of Classification Search
CPC ..................................................... H04W 4/023
(Continued)

(56) References Cited

U.S. PATENT DOCUMENTS 8,538,458 B2    9/2013 Haney
2014/0130137 A1 5/2014 Baek et al.
(Continued)

FOREIGN PATENT DOCUMENTS

CN    102984699 A    3/2013
CN    103379580 A    10/2013
(Continued)

OTHER PUBLICATIONS

"3rd Generation Partnership Project; Technical Specification Group Core Network and Terminals; IP Multimedia Subsystem (IMS) Application Level Gateway (IMS-ALG)—IMS Access Gateway (IMS-AGW) interface: Procedures descriptions (Release 12)," 3GPP TS 23.334 V12.4.0, Jun. 2014, 118 pages.

(Continued)

*Primary Examiner* — Joel Ajayi
(74) *Attorney, Agent, or Firm* — Conley Rose, P.C.

(57) ABSTRACT

The present disclosure provides a ProSe information transmission method, a terminal, and a communications device. The method includes: acquiring, by a second terminal, a fourth code word broadcast by a first terminal, where the fourth code word is a code word that is allocated to the first terminal by a first ProSe entity; sending, by the second terminal, a first message to a second ProSe entity when the fourth code word matches a prestored code word, where the first message carries the fourth code word and a first application identity; receiving, by the second terminal, a second message sent by the second ProSe entity, where the second message carries a second identity; and discovering, by the second terminal, a first application user according to (Continued)

the second identity. The present disclosure is applicable to the communications field.

16 Claims, 27 Drawing Sheets

(51) Int. Cl.
  *H04W 8/00* (2009.01)
  *H04L 29/08* (2006.01)
  *H04W 4/06* (2009.01)
  *H04W 84/04* (2009.01)
  *H04W 88/02* (2009.01)
(52) U.S. Cl.
  CPC ............. *H04W 48/16* (2013.01); *H04L 67/16* (2013.01); *H04W 84/042* (2013.01); *H04W 88/02* (2013.01)
(58) Field of Classification Search
  USPC ...................................................... 455/456.2
  See application file for complete search history.

(56) References Cited

U.S. PATENT DOCUMENTS

| | | | |
|---|---|---|---|
| 2014/0341132 A1* | 11/2014 | Kim | H04W 8/005 370/329 |
| 2015/0019726 A1 | 1/2015 | Zhou et al. | |
| 2015/0079899 A1* | 3/2015 | Hakola | H04W 8/005 455/39 |
| 2015/0081823 A1 | 3/2015 | Gao et al. | |
| 2015/0172037 A1 | 6/2015 | Morita | |
| 2016/0105791 A1 | 4/2016 | Wang et al. | |
| 2016/0374038 A1 | 12/2016 | Wang | |

FOREIGN PATENT DOCUMENTS

| | | |
|---|---|---|
| CN | 103428630 A | 12/2013 |
| CN | 103828398 A | 5/2014 |
| CN | 103828474 A | 5/2014 |
| CN | 103856927 A | 6/2014 |
| WO | 2013154546 A1 | 10/2013 |
| WO | 2013163634 A1 | 10/2013 |
| WO | 2013177454 A1 | 11/2013 |
| WO | 2014034572 A1 | 3/2014 |

OTHER PUBLICATIONS

"3rd Generation Partnership Project; Technical Specification Group Core Network and Terminals; Proximity-services (ProSe) User Equipment (UE) to Proximity-services (ProSe) Function Protocol aspects; Stage 3 (Release 12)," 3GPP TS 24.334 V1.0.0, Jun. 2014, 43 pages.
"3rd Generation Partnership Project; Technical Specification Group Services and System Aspects; Study on architecture enhancements to support Proximity-based Services (ProSe) (Release 12)," 3GPP TR 23.703 V12.0.0, Feb. 2014, 324 pages.
"3rd Generation Partnership Project; Technical Specification Group Services and System Aspects; Proximity-based services (ProSe); Stage 2 (Release 12)," 3GPP TS 23.303 V12.1.0, Jun. 2014, 60 pages.
Huawei, et al., "Network Triggered ProSe Direct Discovery," S2-133280, Sep. 18, 2013, 6 pages.
Ericsson "ProSe Identities open issues resolved," S2-133680, Sep. 26, 2013, 8 pages.
Huawei, et al., "Update and Evaluation on ProSe discovery solution D9," S2-134067, Nov. 12, 2013, 12 pages.
Huawei, et al., "Adding Interaction of Service Platform and ProSe Function", S2-140625,SA WG2 Meeting #101bis Feb. 17-21, 2014, San Jose Del Cabo, Mexico, 11 pages.
Huawei, et al., "Restricted Direct Discovery in always announcement," S2-142499, Jul. 2, 2014, 6 pages.
Huawei, et al., "Discussion on Identities Usage on Restricted Direct Discovery," S2-142500, Jul. 2, 2014, 6 pages.
Foreign Communication From a Counterpart Application, Chinese Application No. 201480005416.0, Chinese Search Report dated Apr. 25, 2016, 6 pages.
Foreign Communication From a Counterpart Application, Japanese Application No. 2016-559637, Japanese Office Action dated Dec. 26, 2017, 4 pages.
Foreign Communication From a Counterpart Application, Japanese Application No. 2016-559637, English Translation of Japanese Office Action dated Dec. 26, 2017, 6 pages.
Foreign Communication From a Counterpart Application, European Application No. 14896329.1, Extended European Search Report dated Feb. 13, 2017, 15 pages.
Foreign Communication From a Counterpart Application, PCT Application No. PCT/CN2014/081292, International Search Report dated Apr. 1, 2015, 7 pages.
Foreign Communication From a Counterpart Application, PCT Application No. PCT/CN2014/081292, Written Opinion dated Apr. 1, 2015, 9 pages.
Foreign Communication From a Counterpart Application, PCT Application No. PCT/CN2014/085616, English Translation of International Search Report dated Apr. 3, 2015, 2 pages.
Foreign Communication From a Counterpart Application, PCT Application No. PCT/CN2014/085616, English Translation of Written Opinion dated Apr. 3, 2015, 8 pages.

* cited by examiner

PROSE INFORMATION TRANSMISSION METHOD, TERMINAL, AND COMMUNICATIONS DEVICE

CROSS-REFERENCE TO RELATED APPLICATIONS

This application is a continuation of U.S. patent application Ser. No. 15/303,406, filed on Oct. 11, 2016, which is a National Stage of International Application No. PCT/CN2014/085616, filed on Aug. 29, 2014, which claims priority to International Patent Application No. PCT/CN2014/081292, filed on Jun. 30, 2014. All of the aforementioned patent applications are hereby incorporated by reference in their entireties.

TECHNICAL FIELD

The present disclosure relates to the communications field, and in particular, to a proximity service (ProSe) information transmission method, a user terminal (UE), and a communications device.

BACKGROUND

In a traditional mobile network, a data communication path between terminals needs to pass through a core network entity serving gateway (SGW)/a packet data network gateway (PGW). Therefore, even when data is transferred between two terminals in close proximity, transmission still needs to go through a core network, resulting in a relatively great requirement for network transmission bandwidth and relatively low transmission efficiency.

To resolve the problem, a ProSe project is proposed. ProSe requires that terminals directly perform data exchange with each other, or that data exchange is performed only by using a base station but not by using a core network entity SGW/PGW. Therefore, communication efficiency between terminals in proximity can be improved.

To implement direct communication between terminals, two terminals need to perform mutual discovery. In some scenarios, mutual discovery between two terminals may be converted into mutual discovery between two application users, that is, if application users of a same application on two terminals implement mutual discovery, it may be considered that the two terminals have discovered each other. In the prior art, when two application users perform mutual discovery, the following problem exists:

In a process of mutual discovery between terminals, a second terminal has already stored a correspondence between an APP User ID of a first terminal and a corresponding code word of the APP User ID, and therefore, after obtaining, by means of monitoring, a code word, broadcast by the first terminal, of an application terminal identity (APP User ID) of the first terminal, the second terminal may directly discover the first terminal, but a network cannot learn an event that two application users have discovered each other, which is unfavorable to expense settlement of an operator and monitoring of a network event.

SUMMARY

Embodiments of the present disclosure provide a ProSe information transmission method, a terminal, and a communications device, which can resolve a problem that a network fails to learn an event that application users discover each other.

To achieve the foregoing objective, the embodiments of the present disclosure provide the following solutions:

According to a first aspect, a proximity service ProSe information transmission method is provided, where the method includes:

receiving, by a second ProSe entity, a first message sent by a second terminal, where the first message is used to instruct the second ProSe entity to acquire a second identity, the second identity is a temporary application user identity that is allocated to a first application user by a first application server, the first application user is a user of a first application of a first terminal, the first application server is an application server of the first application, and the second ProSe entity is a ProSe entity in a home public land mobile network HPLMN of the second terminal;

acquiring, by the second ProSe entity, the second identity; and sending, by the second ProSe entity, a second message to the second terminal, where the second message carries the second identity, and the second identity is used to indicate the first application user discovered by the second terminal.

With reference to the first aspect, in a first possible implementation manner of the first aspect, the second message further carries a first application identity, the first application identity is an application identity of the first application, and the first application identity is used to indicate the first application corresponding to the second identity.

With reference to the first aspect or the first possible implementation manner of the first aspect, in a second possible implementation manner of the first aspect, the first message carries a fourth code word and the first application identity, the fourth code word is a code word that is allocated to the first terminal by a first ProSe entity, the first application identity is the application identity of the first application, and the first ProSe entity is a ProSe entity in an HPLMN of the first terminal; and the acquiring, by the second ProSe entity, the second identity includes:

sending, by the second ProSe entity, a third message to the first ProSe entity, where the third message carries the fourth code word and the first application identity, so that the first ProSe entity acquires the fourth code word and the second identity corresponding to the first application identity; and receiving, by the second ProSe entity, a fourth message sent by the first ProSe entity, where the fourth message carries the second identity.

With reference to the second possible implementation manner of the first aspect, in a third possible implementation manner of the first aspect, the fourth message further carries the first application identity, and the first application identity is used to indicate the first application corresponding to the second identity.

With reference to the first aspect to the third possible implementation manner of the first aspect, in a fourth possible implementation manner of the first aspect, before the receiving, by a second ProSe entity, a first message sent by a second terminal, the method further includes:

receiving, by the second ProSe entity, a fifth message sent by the second terminal, where the fifth message is used to instruct the second ProSe entity to acquire the fourth code word, the fourth code word is the code word that is allocated to the first terminal by the first ProSe entity, and the first ProSe entity is the ProSe entity in the HPLMN of the first terminal;

acquiring, by the second ProSe entity, the fourth code word; and sending, by the second ProSe entity, a sixth message to the second terminal, where the sixth message carries the fourth code word.

With reference to the fourth possible implementation manner of the first aspect, in a fifth possible implementation manner of the first aspect, the fifth message carries a third identity and the first application identity, the third identity is a temporary terminal identity that is allocated to the second terminal by the second ProSe entity, and the first application identity is the application identity of the first application; and the acquiring, by the second ProSe entity, the fourth code word includes:

sending, by the second ProSe entity, a seventh message to the first application server according to the first application identity, where the seventh message carries the third identity;

receiving, by the second ProSe entity, an eighth message sent by the first application server, where the eighth message carries a first identity, and the first identity is a temporary terminal identity that is allocated to the first terminal by the first ProSe entity;

sending, by the second ProSe entity, a ninth message to the first ProSe entity, where the ninth message carries the first identity; and receiving, by the second ProSe entity, a tenth message sent by the first ProSe entity, where the tenth message carries the fourth code word.

With reference to the fourth possible implementation manner of the first aspect, in a sixth possible implementation manner of the first aspect, the fifth message carries first information, a fourth identity, and the first application identity, where the first information includes a third identity or a sixth identity, the third identity is a temporary terminal identity that is allocated to the second terminal by the second ProSe entity, the sixth identity is a terminal identity of the second terminal, the fourth identity is a temporary application user identity that is allocated to a second application user by the first application server, the second application user is a user of the first application of the second terminal, and the first application identity is the application identity of the first application; and the acquiring, by the second ProSe entity, the fourth code word includes:

sending, by the second ProSe entity, a seventh message to the first application server according to the first application identity, where the seventh message carries the fourth identity;

receiving, by the second ProSe entity, an eighth message sent by the first application server, where the eighth message carries a first identity, and the first identity is a temporary terminal identity that is allocated to the first terminal by the first ProSe entity;

sending, by the second ProSe entity, a ninth message to the first ProSe entity, where the ninth message carries the first identity; and receiving, by the second ProSe entity, a tenth message sent by the first ProSe entity, where the tenth message carries the fourth code word.

With reference to the first aspect or the first possible implementation manner of the first aspect, in a seventh possible implementation manner of the first aspect, the first message carries a first code word, the first code word is a code word that is allocated to the second identity by a first ProSe entity, and the first ProSe entity is a ProSe entity in an HPLMN of the first terminal; and the acquiring, by the second ProSe entity, the second identity includes:

acquiring, by the second ProSe entity, the second identity according to the first code word.

With reference to the seventh possible implementation manner of the first aspect, in an eighth possible implementation manner of the first aspect, before the sending, by the second ProSe entity, a second message to the second terminal, the method further includes:

sending, by the second ProSe entity, a third message to the first application server, where the third message carries the second identity, and the second identity is a basis on which the first application server determines that an broadcast request of the first application user is allowed; and receiving, by the second ProSe entity, a fourth message sent by the first application server, where the fourth message indicates that the broadcast request of the first application user is allowed.

With reference to the seventh possible implementation manner of the first aspect or the eighth possible implementation manner of the first aspect, in a ninth possible implementation manner of the first aspect, after the sending a second message to the second terminal, the method further includes:

sending, by the second ProSe entity, a fifth message to the first ProSe entity, where the fifth message carries a first identity, the first application identity, and a fourth identity, the first identity is a temporary terminal identity that is allocated to the first terminal by the first ProSe entity, the first application identity is the application identity of the first application, the fourth identity is a temporary application user identity that is allocated to a second application user by the first application server, and the second application user is a user of the first application of the second terminal.

With reference to the seventh possible implementation manner of the first aspect to the ninth possible implementation manner of the first aspect, in a tenth possible implementation manner of the first aspect, before the receiving, by a second ProSe entity, a first message, the method further includes:

receiving, by the second ProSe entity, a sixth message sent by the second terminal, where the sixth message carries a third identity and the first application identity, the third identity is a temporary terminal identity that is allocated to the second terminal by the second ProSe entity, and the first application identity is the application identity of the first application;

determining, by the second ProSe entity, the fourth identity according to the third identity and the first application identity, where the fourth identity is the temporary application user identity that is allocated to the second application user by the first application server, and the second application user is the user of the first application of the second terminal;

sending, by the second ProSe entity, a seventh message to the first application server, where the seventh message carries the fourth identity;

receiving, by the second ProSe entity, an eighth message sent by the first application server, where the eighth message carries a correspondence between the first identity and the second identity, where the correspondence between the first identity and the second identity is determined by the first application server according to the fourth identity, and the first identity is the temporary terminal identity that is allocated to the first terminal by the first ProSe entity;

sending, by the second ProSe entity, a ninth message to the first ProSe entity, where the ninth message carries the first identity and the first application identity;

receiving, by the second ProSe entity, a tenth message sent by the first ProSe entity, where the tenth message carries the first code word, and the first code word is determined by the first ProSe entity according to the first identity and the first application identity; and sending, by the second ProSe entity, an eleventh message to the second terminal, where the eleventh message carries the first code word.

With reference to the seventh possible implementation manner of the first aspect to the ninth possible implementation manner of the first aspect, in an eleventh possible implementation manner of the first aspect, before the receiving, by a second ProSe entity, a first message, the method further includes:

receiving, by the second ProSe entity, a sixth message sent by the first application server, where the sixth message carries a correspondence between the first identity and the second identity, the first application identity, and a third identity, the first identity is the temporary terminal identity that is allocated to the first terminal by the first ProSe entity, the first application identity is the application identity of the first application, and the third identity is a temporary terminal identity that is allocated to the second terminal by the second ProSe entity;

sending, by the second ProSe entity, a seventh message to the first ProSe entity, where the seventh message carries the first identity and the first application identity;

receiving, by the second ProSe entity, an eighth message sent by the first ProSe entity, where the eighth message carries the first code word, and the first code word is determined by the first ProSe entity according to the first identity and the first application identity; and sending, by the second ProSe entity, a ninth message to the second terminal, where the ninth message carries the first code word.

According to a second aspect, a proximity service ProSe information transmission method is provided, where the method includes:

acquiring, by a second terminal, a fourth code word broadcast by a first terminal, where the fourth code word is a code word that is allocated to the first terminal by a first ProSe entity, and the first ProSe entity is a ProSe entity in a home public land mobile network HPLMN of the first terminal;

sending, by the second terminal, a first message to a second ProSe entity when the fourth code word matches a prestored code word, where the first message carries the fourth code word and a first application identity, the first application identity is an application identity of a first application, and the second ProSe entity is a ProSe entity in an HPLMN of the second terminal;

receiving, by the second terminal, a second message sent by the second ProSe entity, where the second message carries a second identity, the second identity is a temporary application user identity that is allocated to a first application user by a first application server, the first application user is a user of the first application of the first terminal, and the first application server is an application server of the first application; and discovering, by the second terminal, the first application user according to the second identity.

With reference to the second aspect, in a first possible implementation manner of the second aspect, the second message further carries the first application identity, and the first application identity is used to indicate the first application corresponding to the second identity.

With reference to the second aspect or the first possible implementation manner of the second aspect, in a second possible implementation manner of the second aspect, when the fourth code word matches the prestored code word, and before the acquiring, by a second terminal, a fourth code word broadcast by a first terminal, the method further includes:

sending, by the second terminal, a third message to the second ProSe entity, where the third message carries a third identity and the first application identity, and the third identity is a temporary terminal identity that is allocated to the second terminal by the second ProSe entity; and receiving, by the second terminal, a fourth message sent by the second ProSe entity, where the fourth message carries the fourth code word.

With reference to the second aspect or the first possible implementation manner of the second aspect, in a third possible implementation manner of the second aspect, when the fourth code word matches the prestored code word, and before the acquiring, by a second terminal, a fourth code word broadcast by a first terminal, the method further includes:

sending, by the second terminal, a third message to the second ProSe entity, where the third message carries first information, a fourth identity, and the first application identity, where the first information includes a third identity or a sixth identity, the third identity is a temporary terminal identity that is allocated to the second terminal by the second ProSe entity, the sixth identity is a terminal identity of the second terminal, the fourth identity is a temporary application user identity that is allocated to a second application user by the first application server, and the second application user is a user of the first application of the second terminal; and receiving, by the second terminal, a fourth message sent by the second ProSe entity, where the fourth message carries the fourth code word.

According to a third aspect, a proximity service ProSe information transmission method is provided, where the method includes:

acquiring, by a second terminal, a first code word broadcast by a first terminal, where the first code word is a code word that is allocated to a second identity by a first ProSe entity, the second identity is a temporary application user identity that is allocated to a first application user by a first application server, the first application user is a user of the first application of the first terminal, the first application server is an application server of the first application, and the first ProSe entity is a ProSe entity in a home public land mobile network HPLMN of the first terminal;

sending, by the second terminal, a first message to a second ProSe entity when the first code word matches a prestored code word, where the first message carries the first code word, and the second ProSe entity is a ProSe entity in an HPLMN of the second terminal; and receiving, by the second terminal, a second message sent by the second ProSe entity, where the second message carries the second identity, the second identity is determined by the second ProSe entity according to the first code word, and the second identity is used to instruct to discover the first application user.

With reference to the third aspect, in a first possible implementation manner of the third aspect, when the first code word matches the prestored code word, and before the acquiring, by a second terminal, a first code word broadcast by a first terminal, the method further includes:

sending, by the second terminal, a third message to the second ProSe entity, where the third message carries a third identity and a first application identity, the third identity is a temporary terminal identity that is allocated to the second terminal by the second ProSe entity, and the first application identity is an application identity of the first application; and receiving, by the second terminal, a fourth message sent by the second ProSe entity, where the fourth message carries the first code word, and the first code word is determined by the second ProSe entity according to the third identity and the first application identity.

With reference to the third aspect, in a second possible implementation manner of the third aspect, before the acquiring, by a second terminal, a first code word, the method further includes:

when the first application server is triggered, receiving, by the second terminal, a third message sent by the second ProSe entity, where the third message carries the first code word.

According to a fourth aspect, a second proximity service ProSe entity is provided, where the second ProSe entity includes: a receiving unit, an acquiring unit, and a sending unit; where the receiving unit is configured to receive a first message sent by a second terminal, where the first message is used to instruct the second ProSe entity to acquire a second identity, the second identity is a temporary application user identity that is allocated to a first application user by a first application server, the first application user is a user of a first application of a first terminal, the first application server is an application server of the first application, and the second ProSe entity is a ProSe entity in a home public land mobile network HPLMN of the second terminal;

the acquiring unit is configured to acquire the second identity; and the sending unit is configured to send a second message to the second terminal, where the second message carries the second identity, and the second identity is used to indicate the first application user discovered by the second terminal.

With reference to the fourth aspect, in a first possible implementation manner of the fourth aspect, the first message carries a fourth code word and a first application identity, the fourth code word is a code word that is allocated to the first terminal by a first ProSe entity, the first application identity is the application identity of the first application, and the first ProSe entity is a ProSe entity in an HPLMN of the first terminal; and the acquiring unit is specifically configured to:

send a third message to the first ProSe entity, where the third message carries the fourth code word and the first application identity, so that the first ProSe entity acquires the fourth code word and the second identity corresponding to the first application identity; and receive a fourth message sent by the first ProSe entity, where the fourth message carries the second identity.

With reference to the fourth aspect or the first possible implementation manner of the fourth aspect, in a second possible implementation manner of the fourth aspect, the receiving unit is further configured to: before receiving the first message sent by the second terminal, receive a fifth message sent by the second terminal, where the fifth message is used to instruct the second ProSe entity to acquire the fourth code word, the fourth code word is the code word that is allocated to the first terminal by the first ProSe entity, and the first ProSe entity is the ProSe entity in the HPLMN of the first terminal;

the acquiring unit is further configured to acquire the fourth code word; and the sending unit is further configured to send a sixth message to the second terminal, where the sixth message carries the fourth code word.

With reference to the second possible implementation manner of the fourth aspect, in a third possible implementation manner of the fourth aspect, the fifth message carries a third identity and the first application identity, the third identity is a temporary terminal identity that is allocated to the second terminal by the second ProSe entity, and the first application identity is the application identity of the first application; and the acquiring unit is specifically configured to:

send a seventh message to the first application server according to the first application identity, where the seventh message carries the third identity;

receive an eighth message sent by the first application server, where the eighth message carries a first identity, and the first identity is a temporary terminal identity that is allocated to the first terminal by the first ProSe entity;

send a ninth message to the first ProSe entity, where the ninth message carries the first identity; and receive a tenth message sent by the first ProSe entity, where the tenth message carries the fourth code word.

With reference to the second possible implementation manner of the fourth aspect, in a fourth possible implementation manner of the fourth aspect, the fifth message carries first information, a fourth identity, and the first application identity, where the first information includes a third identity or a sixth identity, the third identity is a temporary terminal identity that is allocated to the second terminal by the second ProSe entity, the sixth identity is a terminal identity of the second terminal, the fourth identity is a temporary application user identity that is allocated to a second application user by the first application server, the second application user is a user of the first application of the second terminal, and the first application identity is the application identity of the first application; and the acquiring unit is specifically configured to:

send a seventh message to the first application server according to the first application identity, where the seventh message carries the fourth identity;

receive an eighth message sent by the first application server, where the eighth message carries a first identity, and the first identity is a temporary terminal identity that is allocated to the first terminal by the first ProSe entity;

send a ninth message to the first ProSe entity, where the ninth message carries the first identity; and receive a tenth message sent by the first ProSe entity, where the tenth message carries the fourth code word.

With reference to the fourth aspect, in a fifth possible implementation manner of the fourth aspect, the first message carries a first code word, the first code word is a code word that is allocated to the second identity by a first ProSe entity, and the first ProSe entity is a ProSe entity in an HPLMN of the first terminal; and the acquiring unit is specifically configured to:

acquire the second identity according to the first code word.

With reference to the fifth possible implementation manner of the fourth aspect, in a sixth possible implementation manner of the fourth aspect, the sending unit is further configured to: before sending the second message to the second terminal, send a third message to the first application server, where the third message carries the second identity, and the second identity is a basis on which the first application server determines that an broadcast request of a first application user is allowed; and the receiving unit is further configured to receive a fourth message sent by the first application server, where the fourth message indicates that the broadcast request of the first application user is allowed.

With reference to the fifth possible implementation manner of the fourth aspect or the sixth possible implementation manner of the fourth aspect, in a seventh possible implementation manner of the fourth aspect, the sending unit is further configured to: after sending the second message to the second terminal, send a fifth message to the first ProSe entity, where the fifth message carries a first identity, the first application identity, and a fourth identity, the first identity is a temporary terminal identity that is allocated to the first terminal by the first ProSe entity, the first application identity is the application identity of the first application, the fourth identity is a temporary application user identity that is allocated to a second application user by the first application server, and the second application user is a user of the first application of the second terminal.

With reference to the fifth possible implementation manner of the fourth aspect to the seventh possible implementation manner of the fourth aspect, in an eighth possible implementation manner of the fourth aspect, the second ProSe entity further includes a determining unit; and the receiving unit is further configured to: before receiving the first message, receive a sixth message sent by the second terminal, where the sixth message carries a third identity and the first application identity, the third identity is a temporary terminal identity that is allocated to the second terminal by the second ProSe entity, and the first application identity is the application identity of the first application;

the determining unit is configured to determine the fourth identity according to the third identity and the first application identity, where the fourth identity is the temporary application user identity that is allocated to the second application user by the first application server, and the second application user is the user of the first application of the second terminal;

the sending unit is further configured to send a seventh message to the first application server, where the seventh message carries the fourth identity;

the receiving unit is further configured to receive an eighth message sent by the first application server, where the eighth message carries a correspondence between the first identity and the second identity, where the correspondence between the first identity and the second identity is determined by the first application server according to the fourth identity, and the first identity is the temporary terminal identity that is allocated to the first terminal by the first ProSe entity;

the sending unit is further configured to send a ninth message to the first ProSe entity, where the ninth message carries the first identity and the first application identity;

the receiving unit is further configured to receive a tenth message sent by the first ProSe entity, where the tenth message carries the first code word, and the first code word is determined by the first ProSe entity according to the first identity and the first application identity; and the sending unit is further configured to send an eleventh message to the second terminal, where the eleventh message carries the first code word.

With reference to the fifth possible implementation manner of the fourth aspect to the seventh possible implementation manner of the fourth aspect, in a ninth possible implementation manner of the fourth aspect, the receiving unit is further configured to: before receiving the first message, receive a sixth message sent by the first application server, where the sixth message carries a correspondence between the first identity and the second identity, the first application identity, and a third identity, the first identity is a temporary terminal identity that is allocated to the first terminal by the first ProSe entity, the first application identity is the application identity of the first application, and the third identity is a temporary terminal identity that is allocated to the second terminal by the second ProSe entity;

the sending unit is further configured to send a seventh message to the first ProSe entity, where the seventh message carries the first identity and the first application identity;

the receiving unit is further configured to receive an eighth message sent by the first ProSe entity, where the eighth message carries the first code word, and the first code word is determined by the first ProSe entity according to the first identity and the first application identity; and the sending unit is further configured to send a ninth message to the second terminal, where the ninth message carries the first code word.

According to a fifth aspect, a second terminal is provided, where the second terminal includes: an acquiring unit, a sending unit, a receiving unit, and a discovery unit; where the acquiring unit is configured to acquire a fourth code word broadcast by a first terminal, where the fourth code word is a code word that is allocated to the first terminal by a first ProSe entity, and the first ProSe entity is a ProSe entity in a home public land mobile network HPLMN of the first terminal;

the sending unit is configured to send a first message to a second ProSe entity when the fourth code word matches a prestored code word, where the first message carries the fourth code word and a first application identity, the first application identity is an application identity of a first application, and the second ProSe entity is a ProSe entity in an HPLMN of the second terminal;

the receiving unit is configured to receive a second message sent by the second ProSe entity, where the second message carries a second identity, the second identity is a temporary application user identity that is allocated to a first application user by a first application server, the first application user is a user of the first application of the first terminal, and the first application server is an application server of the first application; and the discovery unit is configured to discover the first application user according to the second identity.

With reference to the fifth aspect, in a first possible implementation manner of the fifth aspect, the sending unit is further configured to send a third message to the second ProSe entity when the fourth code word matches the prestored code word and before the acquiring unit acquires the fourth code word broadcast by the first terminal, where the third message carries a third identity and the first application identity, and the third identity is a temporary terminal identity that is allocated to the second terminal by the second ProSe entity; and the receiving unit is further configured to receive a fourth message sent by the second ProSe entity, where the fourth message carries the fourth code word.

With reference to the fifth aspect, in a second possible implementation manner of the fifth aspect, the sending unit is further configured to send a third message to the second ProSe entity when the fourth code word matches the prestored code word and before the acquiring unit acquires the fourth code word broadcast by the first terminal, where the third message carries first information, a fourth identity, and the first application identity, where the first information includes a third identity or a sixth identity, the third identity is a temporary terminal identity that is allocated to the second terminal by the second ProSe entity, the sixth identity is a terminal identity of the second terminal, the fourth identity is a temporary application user identity that is allocated to a second application user by the first application server, and the second application user is a user of the first application of the second terminal; and the receiving unit is further configured to receive a fourth message sent by the second ProSe entity, where the fourth message carries the fourth code word.

According to a sixth aspect, a second terminal is provided, where the second terminal includes: an acquiring unit, a sending unit, and a receiving unit; where the acquiring unit is configured to acquire a first code word broadcast by a first terminal, where the first code word is a code word that is allocated to a second identity by a first ProSe entity, the second identity is a temporary application user identity that is allocated to a first application user by a first application server, the first application user is a user of the first application of the first terminal, the first application server is an application server of the first application, and the first ProSe entity is a ProSe entity in a home public land mobile network HPLMN of the first terminal;

the sending is configured to send a first message to a second ProSe entity when the first code word matches a prestored code word, where the first message carries the first code word, and the second ProSe entity is a ProSe entity in an HPLMN of the second terminal; and the receiving unit is configured to receive a second message sent by the second ProSe entity, where the second message carries the second identity, the second identity is determined by the second ProSe entity according to the first code word, and the second identity is used to instruct to discover the first application user.

With reference to the sixth aspect, in a first possible implementation manner of the sixth aspect, the sending unit is further configured to: when the first code word matches the prestored code word, and before the acquiring unit acquires the first code word broadcast by the first terminal, send a third message to the second ProSe entity, where the third message carries a third identity and a first application identity, the third identity is a temporary terminal identity that is allocated to the second terminal by the second ProSe entity, and the first application identity is an application identity of the first application; and the receiving unit is further configured to receive a fourth message sent by the second ProSe entity, where the fourth message carries the first code word, and the first code word is determined by the second ProSe entity according to the third identity and the first application identity.

With reference to the sixth aspect, in a second possible implementation manner of the sixth aspect, the receiving unit is further configured to: before the acquiring unit acquires the first code word, when the first application server is triggered, receive a third message sent by the second ProSe entity, where the third message carries the first code word.

By using the foregoing solutions, in one aspect, after sending a first message to a second terminal, a second ProSe entity may receive a second message that carries a second identity, where the second identity is used to instruct to discover a first application user. It may be learned that, the second ProSe entity can learn an event that a second application user discovers the first application user, and further a first ProSe entity can also learn the event that the second application user discovers the first application user. That is, a network can learn an event that two application users discover each other, which is therefore favorable to expense settlement of an operator and monitoring of a network event. In another aspect, in a ProSe information transmission process, a terminal identity in the prior art is replaced with a temporary terminal identity, and a temporary application user identity in the prior art is replaced with a temporary application user identity, that is, information carried in a process of 3GPP communication between a terminal and a ProSe entity is corresponding information temporarily allocated by the ProSe entity or an application server, and does not belong to personal privacy. Therefore, there is no potential security problem in transmission at a 3GPP layer, and the application server may support this transmission manner.

BRIEF DESCRIPTION OF DRAWINGS

To describe the technical solutions in the embodiments of the present disclosure or in the prior art more clearly, the following briefly describes the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1A:
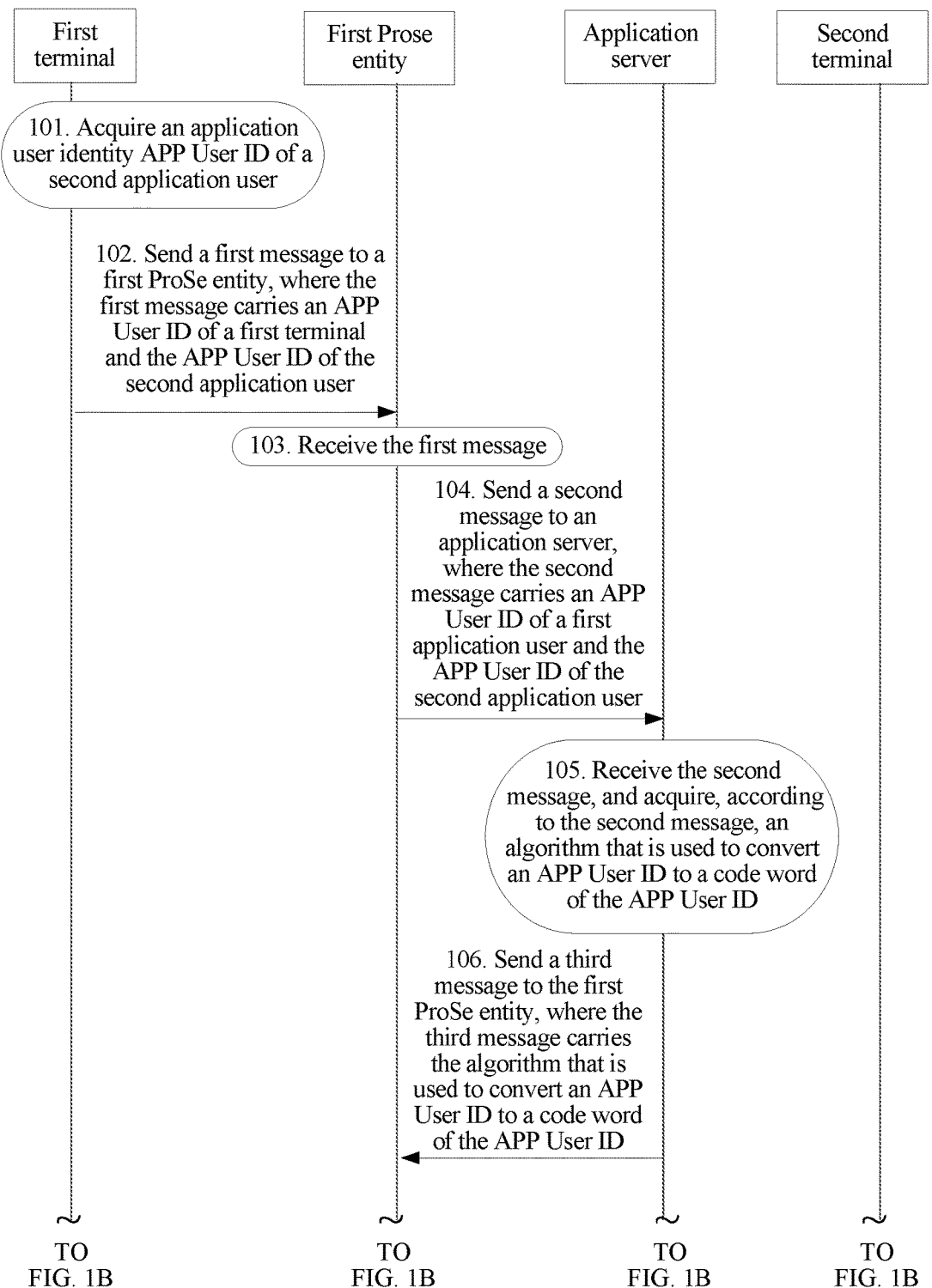
FIG. 1A and FIG. 1B are a schematic interworking diagram of a method in the prior art in which two application users discover each other according to an embodiment of the present disclosure.

First, for brief description of the following embodiments, several related definitions are provided as follows:

A first terminal is a terminal with a broadcast function.

A second terminal is a terminal with a monitoring function.

A first ProSe entity is a ProSe entity in a home public land mobile network (HPLMN) of a first terminal, where the ProSe entity is a logical function and is used in a ProSe; the ProSe entity is a function in the network, and may be a separate entity, or may be carried on another core network device, for example, a mobility management entity (MME), or a PGW; the ProSe entity includes a direct discovery name management function (Direct Discovery Name Management Function) and is used to allocate a code word in a ProSe discovery process.

A second ProSe entity is a ProSe entity in an HPLMN of a second terminal.

A first application identity (APP ID) is an APP ID of a first application, and is generally an identity, in an operating system, of software used by a terminal.

A first application user is a user of a first application of a first terminal.

A second application user is a user of a second application of a second terminal.

A first identity is a temporary terminal identity (Temp UE ID) that is allocated to a first terminal by a first ProSe entity, where the Temp UE ID may be used to uniquely determine UE in an evolved packet core network (EPC).

The EPC is an evolved packet core network defined in the 3rd Generation Partnership Project (3GPP) protocols, and technologies such as a Long Term Evolution (LTE) technology and a High Rate Packet Data (HRPD) technology can be used to access the EPC.

It should be noted that the temporary terminal identity that is allocated to the first terminal by the first ProSe entity may be a real terminal identity of the first terminal, for example, a telephone number, which is not specifically limited in the embodiments of the present disclosure.

A second identity is a temporary application user identity (Temp APP User ID) that is allocated to a first application user by an application server, where the Temp APP User ID may be used to uniquely determine an application user in the application server.

It should be noted that the temporary application user identity that is allocated to the first application user by the application server may be a real application user identity of the first application user, for example, a WeChat ID of the first application user, which is not specifically limited in the embodiments of the present disclosure.

A third identity is a Temp UE ID that is allocated to a second terminal by a second ProSe entity, where the Temp UE ID may be used to uniquely determine UE in an EPC.

It should be noted that the temporary terminal identity that is allocated to the second terminal by the second ProSe entity may be a real terminal identity of the second terminal, for example, a telephone number, which is not specifically limited in the embodiments of the present disclosure.

A fourth identity is a Temp APP User ID that is allocated to a second application user by an application server, where the Temp APP User ID may be used to uniquely determine an application user in the application server.

It should be noted that the temporary application user identity that is allocated to the second application user by the application server may be a real application user identity of the second application user, for example, a WeChat ID of the second application user, which is not specifically limited in the embodiments of the present disclosure.

A first code word is a code word that is allocated to a second identity by a first ProSe entity.

A second code word is a code word that is allocated to a fourth identity by a second ProSe entity.

A fourth code word is a code word that is allocated to a first terminal by a first ProSe entity.

A sixth identity is a terminal identity of a second terminal.

A seventh identity is a terminal identity of a first terminal.

A first application server is an application server of a first application.

Discovery refers to confirming that the other part is nearby.

ProSe information: ProSe information is ProSe information that is required for implementing a ProSe discovery process, and may be the first identity, the second identity, the third identity, the fourth identity, the sixth identity, the seventh identity, the first code word, the second code word, and the fourth code word that are defined above, which is not specifically limited in the embodiments of the present disclosure.

It should be noted that the first code word, the second code word, and a third code word in the embodiments of the present disclosure may be of a hierarchical structure, and are digits that are converted from characters and that can be broadcast by using an air interface. Exemplarily, a code word hierarchy provided herein is shown as follows:

PLMN ID APP ID Type (type) Temp UE ID

A PLMN ID generally refers to a mobile country code (MCC) and a mobile network code (MNC). Certainly, the PLMN ID may have another representation form, which is not specifically limited in the embodiments of the present disclosure. Exemplarily, if the PLMN ID is 46000, it indicates a Chinese mobile operator, where 460 represents China, and 00 represents a mobile operator.

As described above, an APP ID is generally an identity, in an operating system, of software used by a terminal, and may be used to uniquely identify software.

Type indicates whether a current application user is open only to a friend, or open to anyone, or the like.

As described above, a Temp UE ID is a temporary terminal identity that is allocated to a terminal by a ProSe, and may be used to uniquely identify a terminal.

Certainly, the foregoing code word hierarchy structure is merely an exemplary illustration, and the code word hierarchy structure may include other information, which is not specifically limited in the embodiments of the present disclosure.

It should be noted that the foregoing definitions are applicable to all the following embodiments of the disclosure. A unified illustration is provided herein, and is not repeatedly described in the following.

Figure 1B:
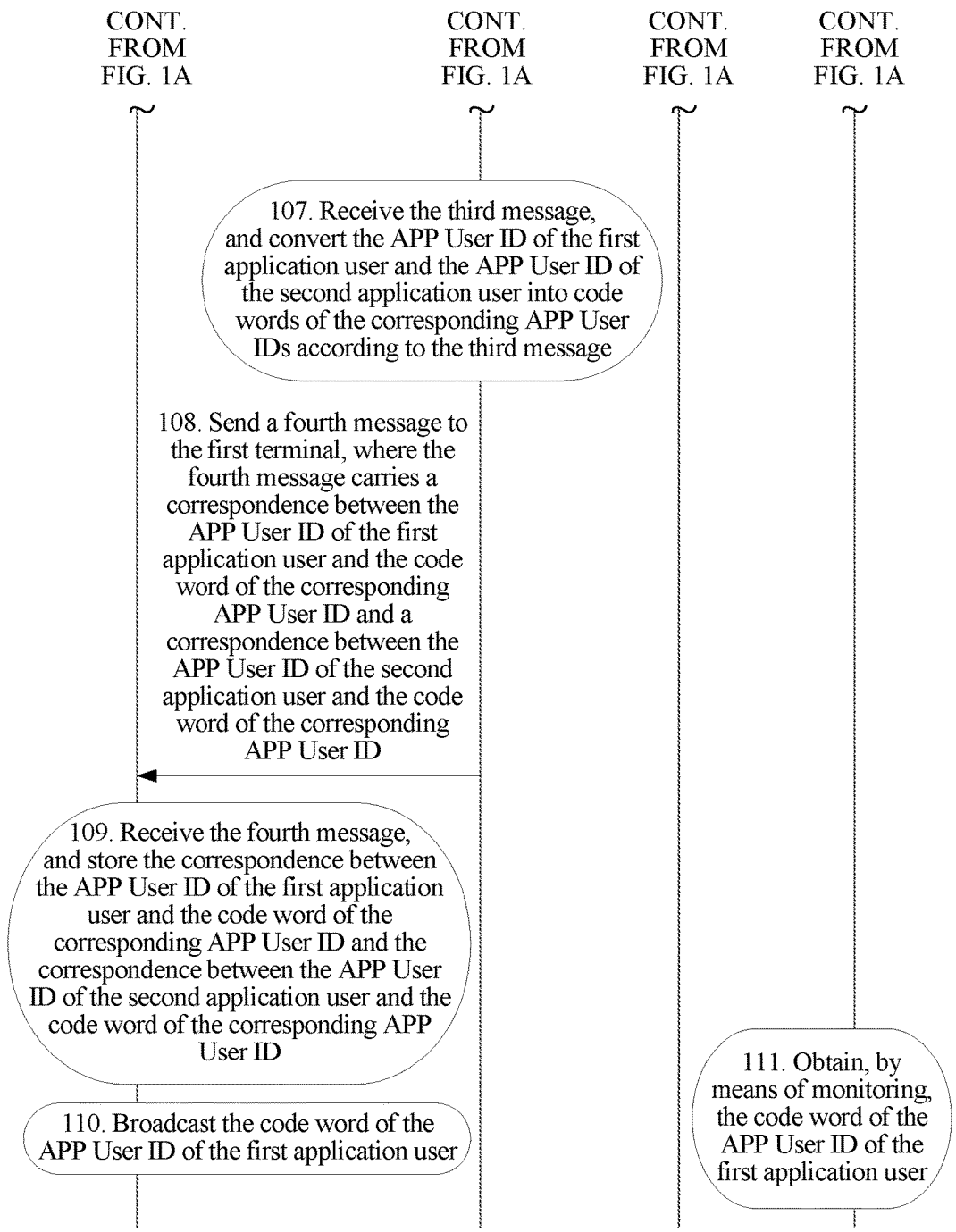

In addition, to facilitate understanding of the background, a brief description of a method in the prior art in which two application users discover each other is provided herein, and referring to FIG. 1A and FIG. 1B, the method includes the following steps:

101. A first terminal acquires an application user identity APP User ID of a second application user.

102. The first terminal sends a first message to a first ProSe entity, where the first message carries an APP User ID of the first terminal and the APP User ID of the second application user.

103. The first ProSe entity receives the first message.

104. The first ProSe entity sends a second message to an application server, where second message carries an APP User ID of a first application user and the APP User ID of the second application user.

105. The application server receives the second message, and acquires, according to the second message, an algorithm that is used to convert an APP User ID into a code word of the APP User ID.

106. The application server sends a third message to the first ProSe entity, where the third message carries the algorithm that is used to convert an APP User ID into a code word of the APP User ID.

107. The first ProSe entity receives the third message, and converts the APP User ID of the first application user and the APP User ID of the second application user into code words of the corresponding APP User IDs according to the third message.

108. The first ProSe entity sends a fourth message to the first terminal, where the fourth message carries a correspondence between the APP User ID of the first application user and the code word of the corresponding APP User ID and a correspondence between the APP User ID of the second application user and the code word of the corresponding APP User ID.

109. The first terminal receives the fourth message and stores the correspondence between the APP User ID of the first application user and the code word of the corresponding APP User ID and the correspondence between the APP User ID of the second application user and the code word of the corresponding APP User ID.

110. The first terminal broadcasts the code word of the APP User ID of the first application user.

111. The second terminal obtains, by means of monitoring, the code word of the APP User ID of the first application user.

It should be noted that the second terminal may perform a process similar to steps 101 to 109 by interacting with the second ProSe entity and the application server, and details are not repeatedly described herein. That is, the second terminal may store the correspondence between the APP User ID of the first application user and the code word of the APP User ID. Therefore, if the first application user and the second application user are mutual friends, after obtaining, by means of monitoring, the code word of the APP User ID of the first application user, the second terminal may determine, according to the stored correspondence between the APP User ID of the first application user and the code word of the APP User ID, the APP User ID corresponding to the code word, obtained by means of monitoring, of the APP User ID of the first application user. That is, if the first application user is a friend of the second application user, after the second terminal obtains, by means of monitoring, the code word of the APP User ID of the first application user in this process, the second application can discover the first application user, or the second terminal can discover the first terminal.

The following clearly and completely describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

To facilitate clear description of the technical solutions in the embodiments of the present disclosure, words such as "first", "second", "third", and "fourth" are used in the embodiments of the present disclosure to distinguish between same items or similar items with basically same functions or purposes. A person skilled in the art may understand that the words such as "first", "second", "third", and "fourth" do not restrict a quantity and an implementation sequence.

Embodiment 1

Figure 2:
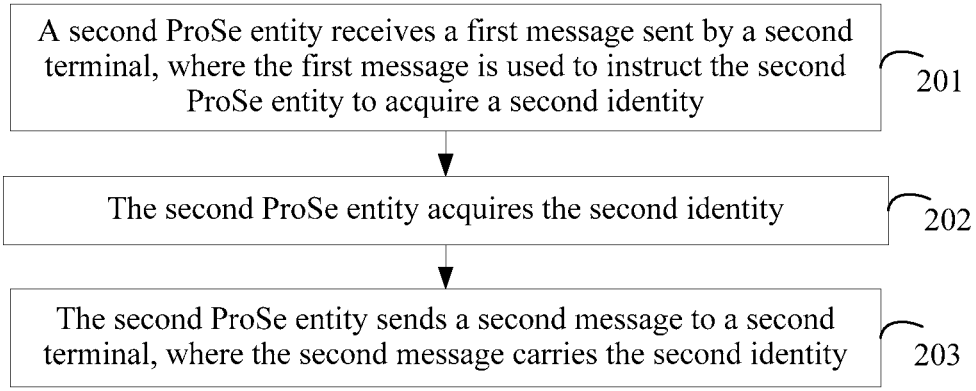
FIG. 2 is a schematic flowchart 1 of a ProSe information transmission method according to an embodiment of the present disclosure.

This embodiment of the present disclosure provides a ProSe information transmission method, which is specifically shown in FIG. 2, and includes the following steps:

201. A second ProSe entity receives a first message sent by a second terminal, where the first message is used to instruct the second ProSe entity to acquire a second identity.

202. The second ProSe entity acquires the second identity.

Specifically, the first message may carry a fourth code word and a first application identity.

That the second ProSe entity acquires the second identity (step 202) may specifically include:

the second ProSe entity sends a third message to a first ProSe entity, where the third message carries the fourth code word and the first application identity, so that the first ProSe entity acquires the fourth code word and the second identity corresponding to the first application identity; and the second ProSe entity receives a fourth message sent by the first ProSe entity, where the fourth message carries the second identity.

Optionally, the fourth message may further carry the first application identity, where the first application identity is used to indicate a first application corresponding to the second identity, which is not specifically limited in this embodiment of the present disclosure.

Certainly, the second ProSe entity may prestore a correspondence among the fourth code word, the first application identity, and the second identity. After receiving the first message that carries the fourth code word and the first application identity, the second ProSe entity may acquire the second identity according to the correspondence, which is not specifically limited in this embodiment of the present disclosure.

203. The second ProSe entity sends a second message to the second terminal, where the second message carries the second identity.

The second identity is used to indicate a first application user discovered by the second terminal.

Optionally, the second message may further carry the first application identity, where the first application identity is used to indicate the first application corresponding to the second identity, which is not specifically limited in this embodiment of the present disclosure.

Figure 3:
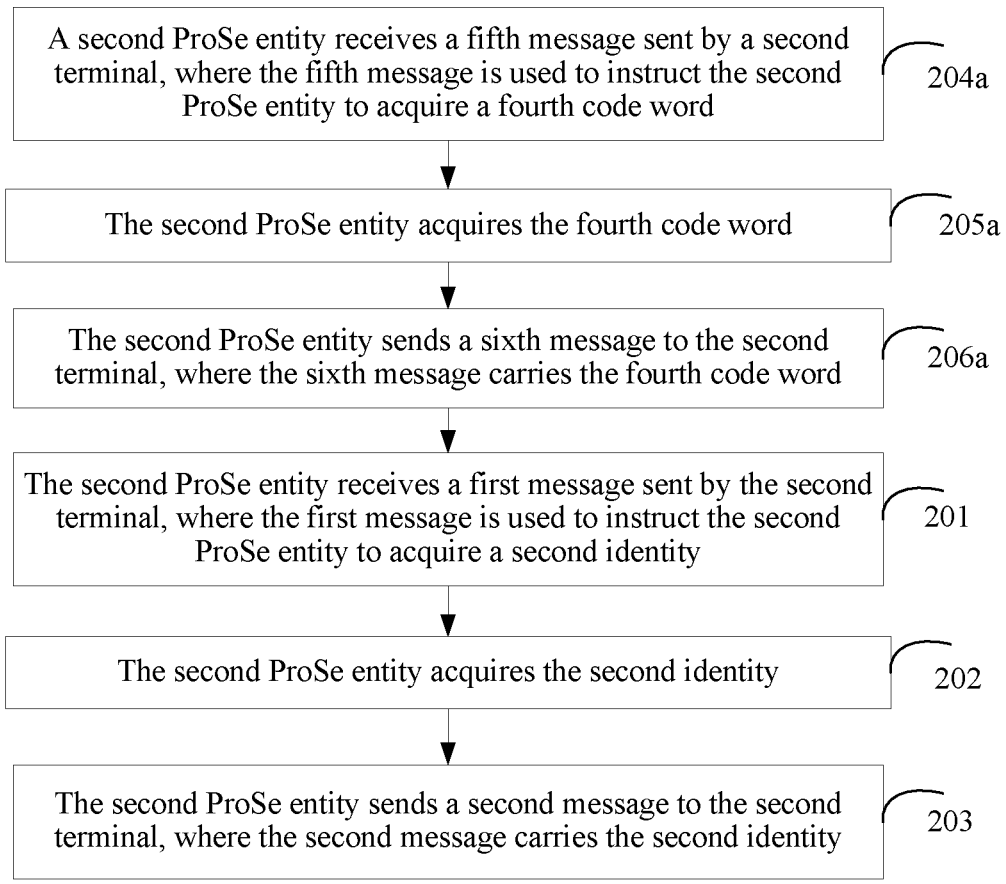
FIG. 3 is a schematic flowchart 2 of a ProSe information transmission method according to an embodiment of the present disclosure.

Further, as shown in FIG. 3, before that a second ProSe entity receives a first message sent by a second terminal (step 201), the method may further include the following steps:

204a. The second ProSe entity receives a fifth message sent by the second terminal, where the fifth message is used to instruct the second ProSe entity to acquire a fourth code word.

205a. The second ProSe entity acquires the fourth code word.

Specifically, the fifth message may carry a third identity and the first application identity.

That the second ProSe entity acquires the fourth code word (step 205a) may specifically include:

the second ProSe entity sends a seventh message to a first application server according to the first application identity, where the seventh message carries the third identity;

the second ProSe entity receives an eighth message sent by the first application server, where the eighth message carries a first identity;

the second ProSe entity sends a ninth message to the first ProSe entity, where the ninth message carries the first identity; and the second ProSe entity receives a tenth message sent by the first ProSe entity, where the tenth message carries the fourth code word.

Optionally, the fifth message may further carry first information, a fourth identity, and the first application identity, where the first information includes a third identity or a sixth identity.

That the second ProSe entity acquires the fourth code word (step 205a) may specifically include:

the second ProSe entity sends a seventh message to a first application server according to the first application identity, where the seventh message carries the fourth identity;

the second ProSe entity receives an eighth message sent by the first application server, where the eighth message carries a first identity;

the second ProSe entity sends a ninth message to the first ProSe entity, where the ninth message carries the first identity; and the second ProSe entity receives a tenth message sent by the first ProSe entity, where the tenth message carries the fourth code word.

206a. The second ProSe entity sends a sixth message to the second terminal, where the sixth message carries the fourth code word.

In another possible implementation manner, the first message carries a first code word, where the first code word is a code word that is allocated to the second identity by a first ProSe entity, and the first ProSe entity is a ProSe entity in an HPLMN of a first terminal.

That the second ProSe entity acquires the second identity specifically includes:

the second ProSe entity acquires the second identity according to the first code word.

Further, before that the second ProSe entity sends a second message to the second terminal (step 201), the ProSe information transmission method provided in this embodiment of the present disclosure may further include:

the second ProSe entity sends a third message to an application server, where the third message carries the second identity, and the second identity is a basis on which the application server determines that an broadcast request of the first application user is allowed; and the second ProSe entity receives a fourth message sent by the application server, where the fourth message indicates that the broadcast request of the first application user is allowed.

That is, after the second ProSe entity learns an event that the first application user is discovered, and before the second ProSe entity sends the second message to the second terminal, whether the broadcast request of the first application user is allowed may be further determined on a side of the application server, and the second message is sent to the second terminal after the application server allows the broadcast request of the first application server. In this way, validity of broadcast of the first application user is further ensured, and therefore, network security is ensured.

And/or after that a second ProSe entity receives a first message sent by a second terminal (step 201), the method may further include:

the second ProSe entity sends a fifth message to the first ProSe entity, where the fifth message carries a first identity, a first application identity, and a fourth identity.

That is, after the second ProSe entity learns the event that the first application user is discovered, the first ProSe entity may be notified of the event that the second application user discovers the first application user, and further, the first ProSe entity is used to notify the first terminal of the event that the second application user discovers the first application user. Therefore, it is ensured that when performing broadcast, the first terminal can learn in a timely manner whether the first terminal is discovered by the second terminal.

Figure 4:
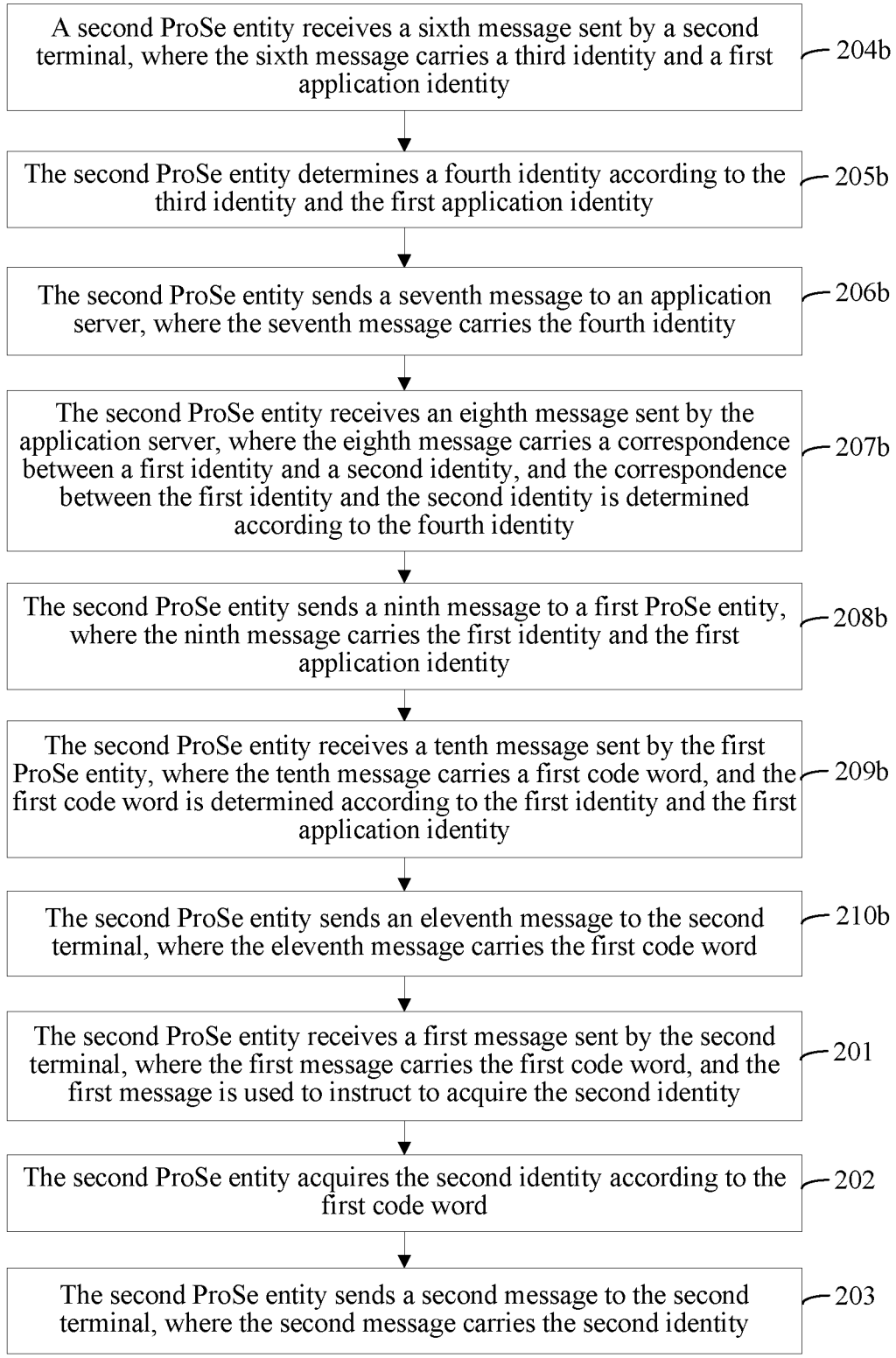
FIG. 4 is a schematic flowchart 3 of a ProSe information transmission method according to an embodiment of the present disclosure.

Further, as shown in FIG. 4, in the ProSe information transmission method provided in this embodiment of the present disclosure, that a second ProSe entity receives a first message sent by a second terminal (step 201) may further include the following steps:

204b. The second ProSe entity receives a sixth message sent by the second terminal, where the sixth message carries a third identity and a first application identity.

Specifically, in this embodiment of the present disclosure, the second terminal at a 3GPP network layer starts a monitoring service, and therefore, the second ProSe entity receives the sixth message sent by the second terminal, where the sixth message carries the third identity and the first application identity.

205b. The second ProSe entity determines a fourth identity according to the third identity and the first application identity.

Specifically, the second ProSe entity may prestore a correspondence among the third identity, the first application identity, and the fourth identity, and after acquiring the third identity and the first application identity, the second ProSe entity may determine the fourth identity according to the correspondence, which is not specifically limited in this embodiment of the present disclosure.

206b. The second ProSe entity sends a seventh message to an application server, where the seventh message carries the fourth identity.

207b. The second ProSe entity receives an eighth message sent by the application server, where the eighth message carries a correspondence between a first identity and the second identity, and the correspondence between the first identity and the second identity is determined by the application server according to the fourth identity.

Specifically, the application server may store a correspondence between the fourth identity and the correspondence between the first identity and the second identity, and therefore, after acquiring the fourth identity, the application server may determine the correspondence between the first identity and the second identity according to the correspondence, which is not specifically limited in this embodiment of the present disclosure.

208b. The second ProSe entity sends a ninth message to a first ProSe entity, where the ninth message carries the first identity and the first application identity.

209b. The second ProSe entity receives a tenth message sent by the first ProSe entity, where the tenth message carries a first code word, and the first code word is determined by the first ProSe entity according to the first identity and the first application identity.

Specifically, the first ProSe entity may store a correspondence among the first identity, the first application identity, and the first code word, and therefore, after acquiring the first identity and the first application identity, the first ProSe entity may determine the first code word according to the correspondence, which is not specifically limited in this embodiment of the present disclosure.

210b. The second ProSe entity sends an eleventh message to the second terminal, where the eleventh message carries the first code word.

Figure 5:
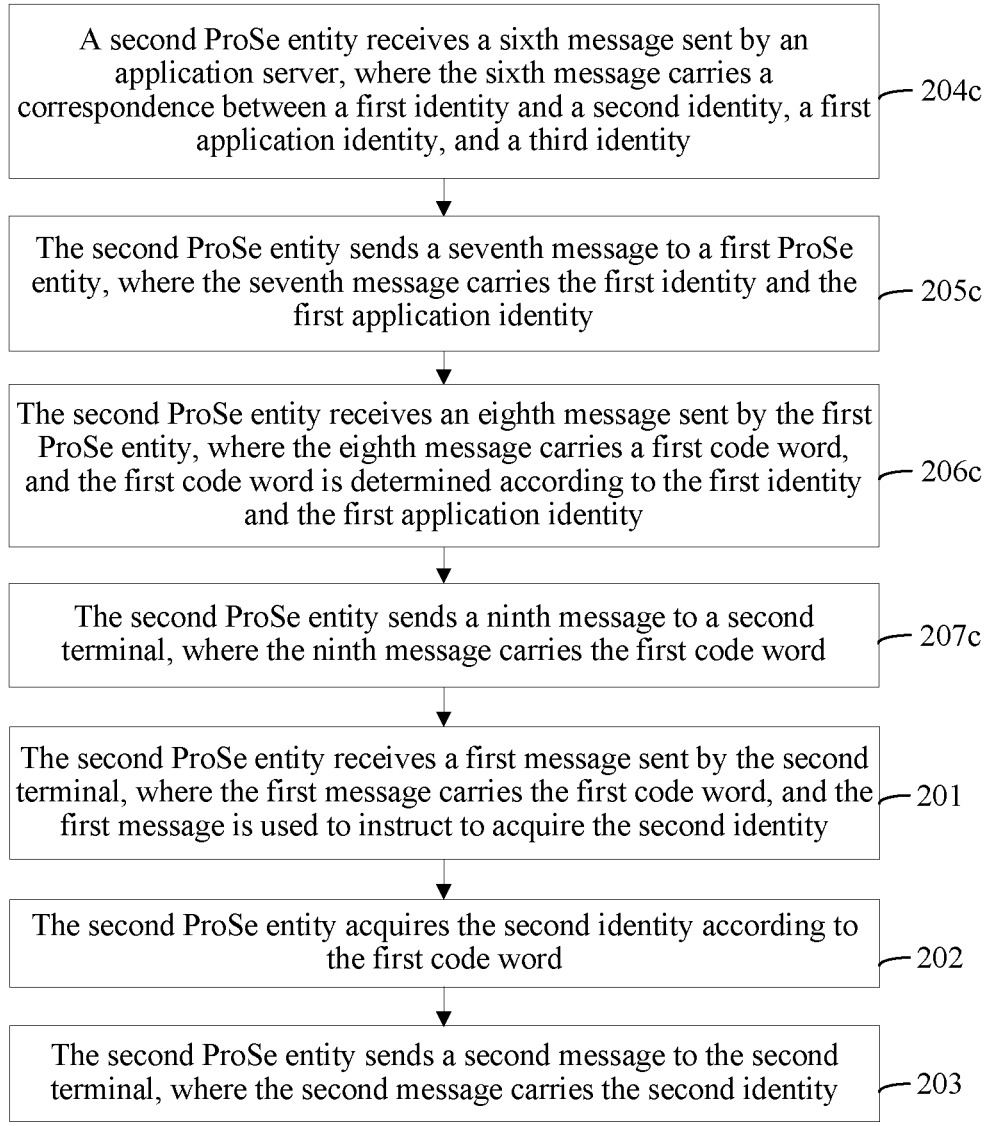
FIG. 5 is a schematic flowchart 4 of a ProSe information transmission method according to an embodiment of the present disclosure.

Optionally, as shown in FIG. 5, before that a second ProSe entity receives a first message sent by a second terminal (step 501), the ProSe information transmission method provided in this embodiment of the present disclosure may further include the following steps:

204c. The second ProSe entity receives a sixth message sent by an application server, where the sixth message carries a correspondence between a first identity and the second identity, a first application identity, and a third identity.

Specifically, in this embodiment of the present disclosure, the application server at an application layer starts a monitoring service, and the application server may store information such as the third identity, the correspondence between the first identity and the second identity, and the first application identity. After being triggered, the application server may send, to the second ProSe entity, the sixth message that carries the correspondence between the first identity and the second identity, the first application identity, and the third identity, which is not specifically limited in this embodiment of the present disclosure.

205c. The second ProSe entity sends a seventh message to a first ProSe entity, where the seventh message carries the first identity and the first application identity.

206c. The second ProSe entity receives an eighth message sent by the first ProSe entity, where the eighth message carries a first code word, and the first code word is determined by the first ProSe entity according to the first identity and the first application identity.

Specifically, the first ProSe entity may store a correspondence among the first identity, the first application identity, and the first code word, and therefore, after acquiring the first identity and the first application identity, the first ProSe entity may determine the first code word according to the correspondence, which is not specifically limited in this embodiment of the present disclosure.

207c. The second ProSe entity sends a ninth message to the second terminal, where the ninth message carries the first code word.

Certainly, after that the second ProSe entity sends a ninth message to the second terminal, where the ninth message carries the first code word (step 207c), the method may further include:

the second ProSe entity receives a tenth message sent by the second terminal, where the tenth message is a response message of the ninth message; and sends an eleventh message to the application server, where the eleventh message is a response message of the sixth message. In this way, the second ProSe entity can determine, according to the tenth message, that the second terminal has acquired the first code word; the application server can determine, according to the eleventh message, that the first ProSe entity has acquired the sixth message. Therefore, accuracy and reliability of ProSe information transmission is ensured.

For related denotations of names such as the second ProSe entity, the first ProSe entity, the first terminal, the second terminal, the second identity, the first application user, the first application identity, the fourth code word, the third identity, the fourth identity, and the sixth identity in this embodiment of the present disclosure, reference may be made to the foregoing unified illustration part, and details are not repeatedly described in this embodiment of the present disclosure.

Based on the foregoing ProSe information transmission method provided in this embodiment of the present disclosure, in one aspect, a second ProSe entity receives a first message sent by a second terminal, where the first message is used to instruct the second ProSe entity to acquire a second identity; and further, the second ProSe entity acquires the second identity, and sends, to the second terminal, a second message that carries the second identity, where the second identity is used to indicate a first application user discovered by the second terminal. It may be learned that, the second ProSe entity can learn an event that a second application user discovers the first application user, and further a first ProSe entity can also learn the event that the second application user discovers the first application user. That is, a network can learn an event that two application users discover each other, which is therefore favorable to expense settlement of an operator and monitoring of a network event. In another aspect, in a ProSe information transmission process, a terminal identity in the prior art is replaced with a temporary terminal identity, and a temporary application user identity in the prior art is replaced with a temporary application user identity, that is, information carried in a process of 3GPP communication between a terminal and a ProSe entity is corresponding information temporarily allocated by the ProSe entity or an application server, and does not belong to personal privacy. Therefore, there is no potential security problem in transmission at a 3GPP layer, and the application server may support this transmission manner.

Figure 6:
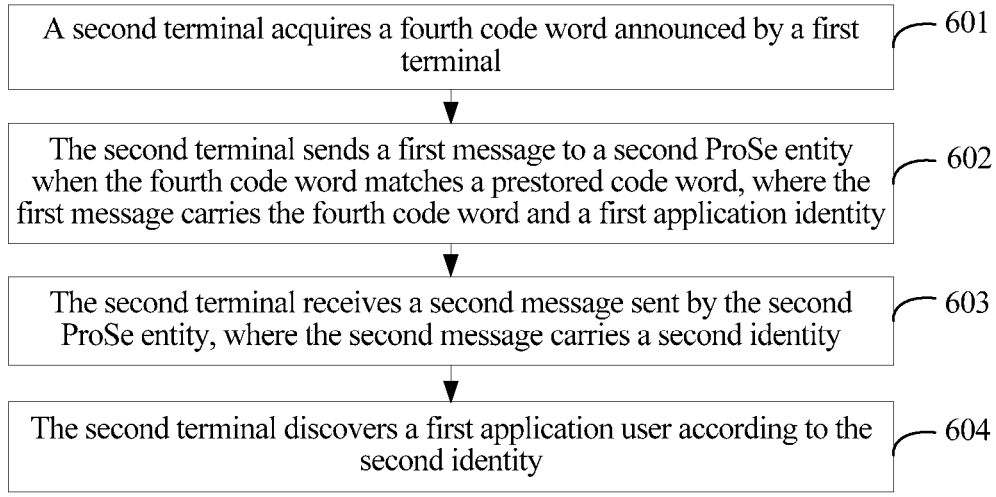
FIG. 6 is a schematic flowchart 5 of a ProSe information transmission method according to an embodiment of the present disclosure.

This embodiment of the present disclosure further provides a ProSe information transmission method, which is specifically shown in FIG. 6, and includes the following steps:

601. A second terminal acquires a fourth code word broadcast by a first terminal.

602. The second terminal sends a first message to a second ProSe entity when the fourth code word matches a prestored code word, where the first message carries the fourth code word and a first application identity.

The first message is used to instruct the second ProSe entity to acquire the fourth code word and a second identity corresponding to the first application identity.

Specifically, the second terminal may prestore some code words that are broadcast by a terminal and that the second terminal wants to monitor. For example, if the second terminal wants to monitor a code word broadcast by a terminal A, the second terminal may prestore the code word. In this way, after obtaining, by means of monitoring, the code word broadcast by the terminal A, the second terminal may determine, according to the stored code word, that the prestored code word includes the code word broadcast by the terminal A. In this case, it may be considered that the code word broadcast by the terminal A matches the prestored code word, and step 602 is performed. Otherwise, if the second terminal does not prestore the code word obtained by means of monitoring, matching fails when the matching is performed on the code word obtained by means of monitoring and the prestored code word. It may be considered that although the second terminal obtains the code word by means of monitoring, the code word is not a code word that the second terminal expects to monitor, and step 602 is not performed for the moment.

603. The second terminal receives a second message sent by the second ProSe entity, where the second message carries a second identity.

The second identity is used to indicate a first application user discovered by the second terminal.

604. The second terminal discovers a first application user according to the second identity.

That is, the second terminal confirms, according to the second identity, that the first application user is near the second terminal.

Specifically, the second terminal may include an application unit of a first application and a 3GPP Layer unit. After acquiring the second identity, the 3GPP Layer unit of the second terminal may send the second identity to the application unit of the first application of the second terminal according to the first application identity, and the application unit may discover the first application user according to the second identity.

Optionally, the second message may further carry the first application identity, where the first application identity is used to indicate the first application corresponding to the second identity, which is not specifically limited in this embodiment of the present disclosure.

Exemplarily, for example, if the first message carries both an application identity A and an application identity B, that is, the second terminal detects the fourth code word on both an application A and an application B, when the second ProSe entity sends the second message to the second terminal, the second message needs to carry the second identity and the first application identity corresponding to the second identity.

Figure 7:
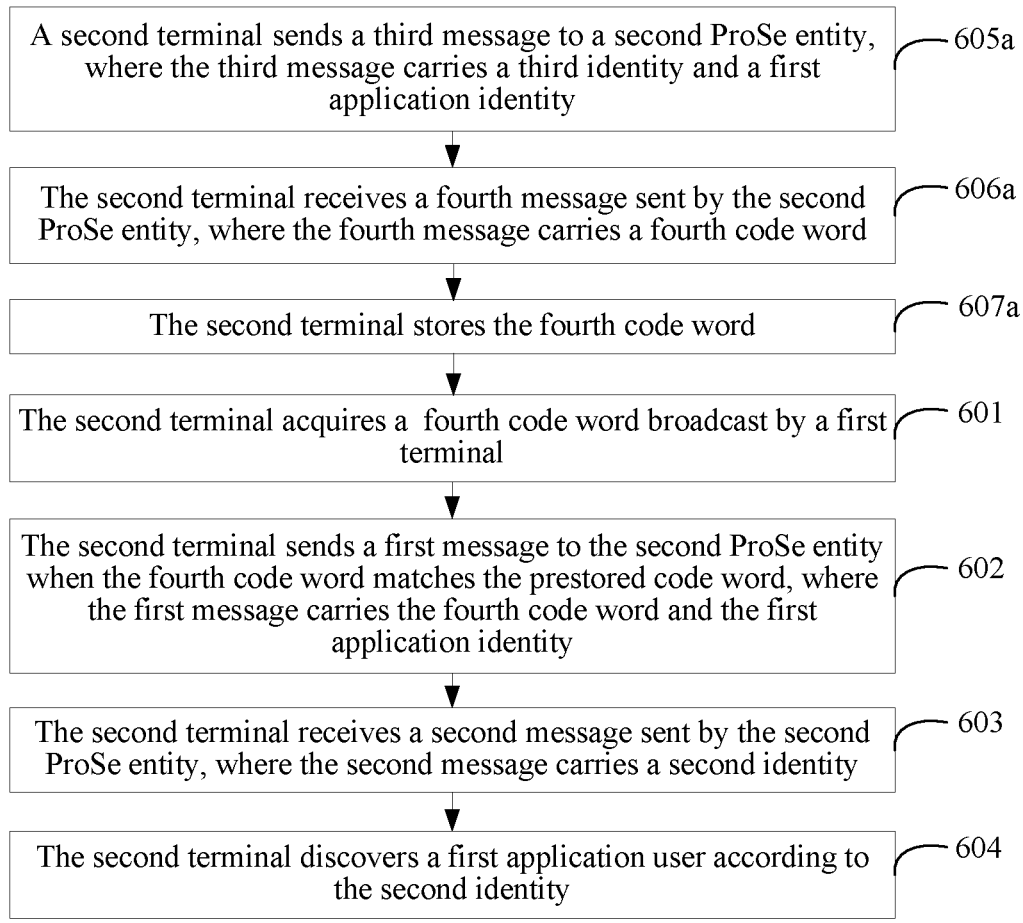
FIG. 7 is a schematic flowchart 6 of a ProSe information transmission method according to an embodiment of the present disclosure.

Further, as shown in FIG. 7, when the fourth code word matches the prestored code word, and before that a second terminal acquires a fourth code word broadcast by a first terminal (step 601), the method may further include the following steps:

605*a*. The second terminal sends a third message to the second ProSe entity, where the third message carries a third identity and the first application identity.

606*a*. The second terminal receives a fourth message sent by the second ProSe entity, where the fourth message carries the fourth code word.

607*a*. The second terminal stores the fourth code word.

Figure 8:
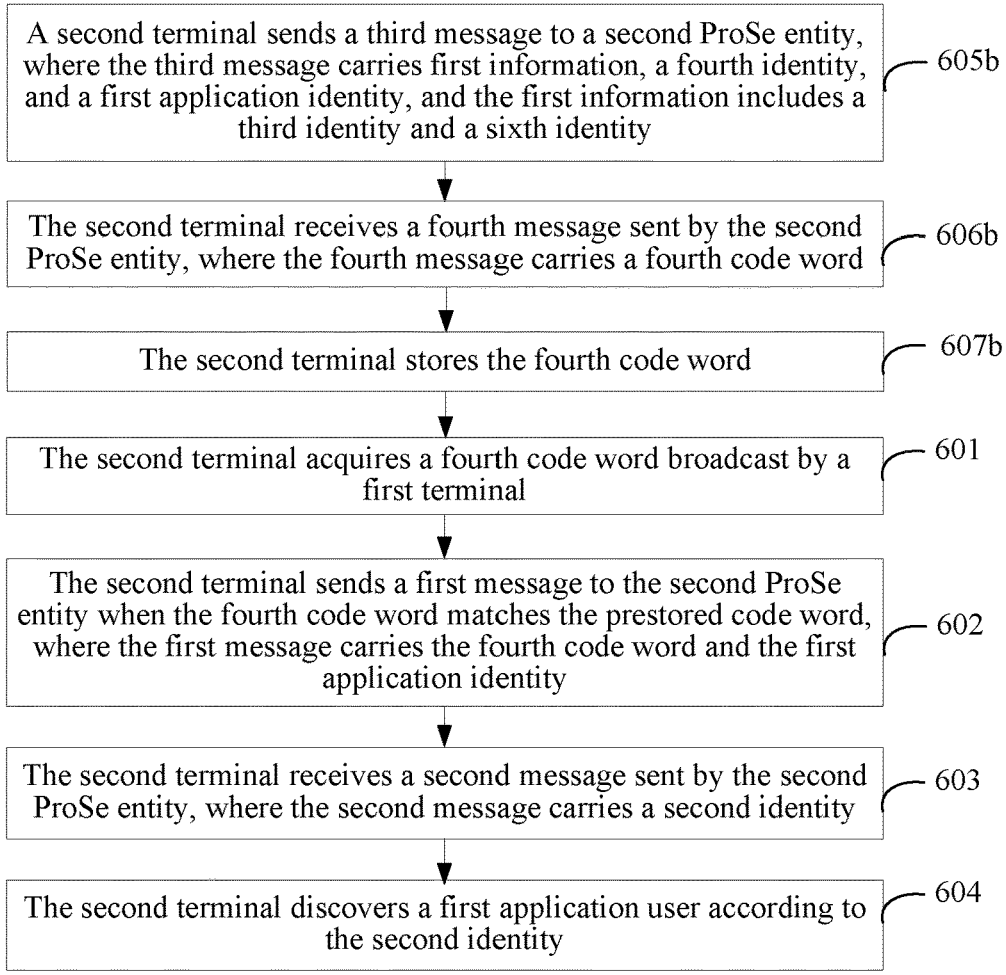
FIG. 8 is a schematic flowchart 7 of a ProSe information transmission method according to an embodiment of the present disclosure.

Optionally, as shown in FIG. 8, when the fourth code word matches the prestored code word, and before that a second terminal acquires a fourth code word broadcast by a first terminal (step 601), the method may further include the following steps:

605*b*. The second terminal sends a third message to the second ProSe entity, where the third message carries first information, a fourth identity, and the first application identity, and the first information includes a third identity and a sixth identity.

606*b*. The second terminal receives a fourth message sent by the second ProSe entity, where the fourth message carries the fourth code word.

Specifically, for step in which after receiving the fourth message, the second ProSe entity acquires the fourth code word according to the third identity and the first application identity, reference may be made to a description on a side of the second ProSe entity, and details are not repeatedly described in this embodiment of the present disclosure.

607*b*. The second terminal stores the fourth code word.

Specifically, because the second terminal may store the first code word in step 607*a* or 607*b*, after obtaining, by means of monitoring, the first code word broadcast by the first terminal, the second terminal may determine, according to the stored code word, that the first code word matches the prestored code word.

For related denotations of names such as the first terminal, the second terminal, the fourth code word, the first application identity, the second ProSe entity, the second identity, the first application user, and the third identity in this embodiment of the present disclosure, reference may be made to the foregoing unified illustration part, and details are not repeatedly described in this embodiment of the present disclosure.

Based on the foregoing ProSe information transmission method provided in this embodiment of the present disclosure, in one aspect, after a second terminal acquires a fourth code word broadcast by a first terminal and when the fourth code word matches a prestored code word, the second terminal further sends, to a second ProSe entity, a first message that carries the fourth code word and a first application identity. In this way, the second ProSe entity can acquire a second identity according to the fourth code word and the first application identity, where the second identity is used to indicate a first application user discovered by the second terminal. It may be learned that, the second ProSe entity can learn an event that a second application user discovers the first application user, and further a first ProSe entity can also learn the event that the second application user discovers the first application user. That is, a network can learn an event that two application users discover each other, which is therefore favorable to expense settlement of an operator and monitoring of a network event. In another aspect, in a ProSe information transmission process, a terminal identity in the prior art is replaced with a temporary terminal identity, and an application user identity in the prior art is replaced with a temporary application user identity, that is, information carried in a process of 3GPP communication between a terminal and a ProSe entity is corresponding information temporarily allocated by the ProSe entity or an application server, and does not belong to personal privacy. Therefore, there is no potential security problem in transmission at a 3GPP layer, and the application server may support this transmission manner.

Figure 9:
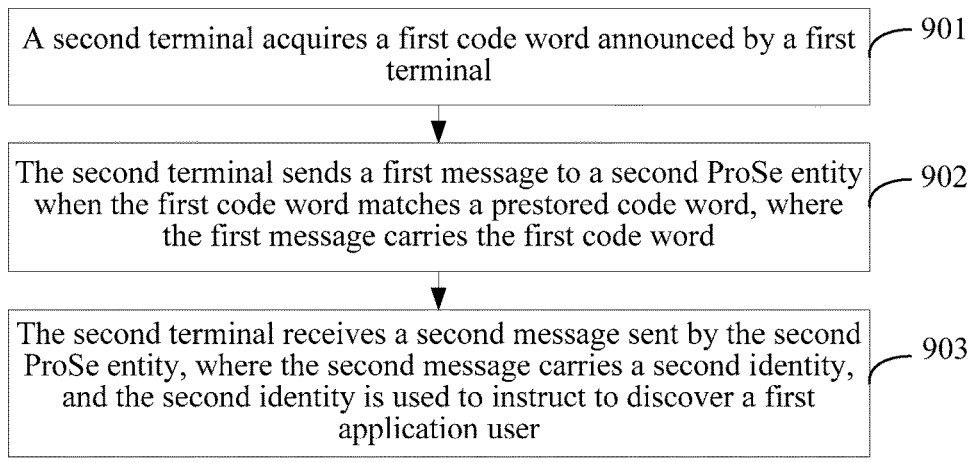
FIG. 9 is a schematic flowchart 8 of a ProSe information transmission method according to an embodiment of the present disclosure.

This embodiment of the present disclosure provides a ProSe information transmission method. Specifically, as shown in FIG. 9, the method includes the following steps:

901. A second terminal acquires a first code word broadcast by a first terminal.

902. The second terminal sends a first message to a second ProSe entity when the first code word matches a prestored code word, where the first message carries the first code word.

Specifically, the second terminal may prestore some code words that are broadcast by a terminal and that the second terminal wants to monitor. For example, if the second terminal wants to monitor a code word broadcast by a terminal A, the second terminal may prestore the code word. In this way, after obtaining, by means of monitoring, the code word broadcast by the terminal A, the second terminal may determine, according to the stored code word, that the prestored code word includes the code word broadcast by the terminal A. In this case, it may be considered that the code word broadcast by the terminal A matches the prestored code word, and step 902 is performed. Otherwise, if the second terminal does not prestore the detected code word, matching fails when the matching is performed on the detected code word and the prestored code word. It may be considered that although the second terminal obtains the code word by means of monitoring, the code word is not a code word that the second terminal expects to monitor, and step 902 is not performed for the moment.

903. The second terminal receives a second message sent by the second ProSe entity, where the second message carries a second identity, and the second identity is used to instruct to discover a first application user.

The second identity is determined by the second ProSe entity according to the first code word.

Specifically, the second terminal may include an application unit of a first application and a 3GPP Layer unit. After acquiring the second identity, the 3GPP Layer unit of the second terminal may determine, according to information about an APP ID in the first code word, that an application identity corresponding to the first code word is a first application identity; afterward, the 3GPP Layer unit of the second terminal may send the second identity to the application unit of the first application of the second terminal according to the first application identity, and the application unit may discover the first application user according to the second identity.

It should be noted that the second message in step 903 may further carry the first application identity. In this way, after acquiring the second identity and the first application identity, the 3GPP Layer unit of the second terminal may send the second identity to the application unit of the first application of the second terminal according to the first application identity, and the application unit may discover the first application user according to the second identity. This case is not specifically limited in this embodiment of the present disclosure.

Figure 10:
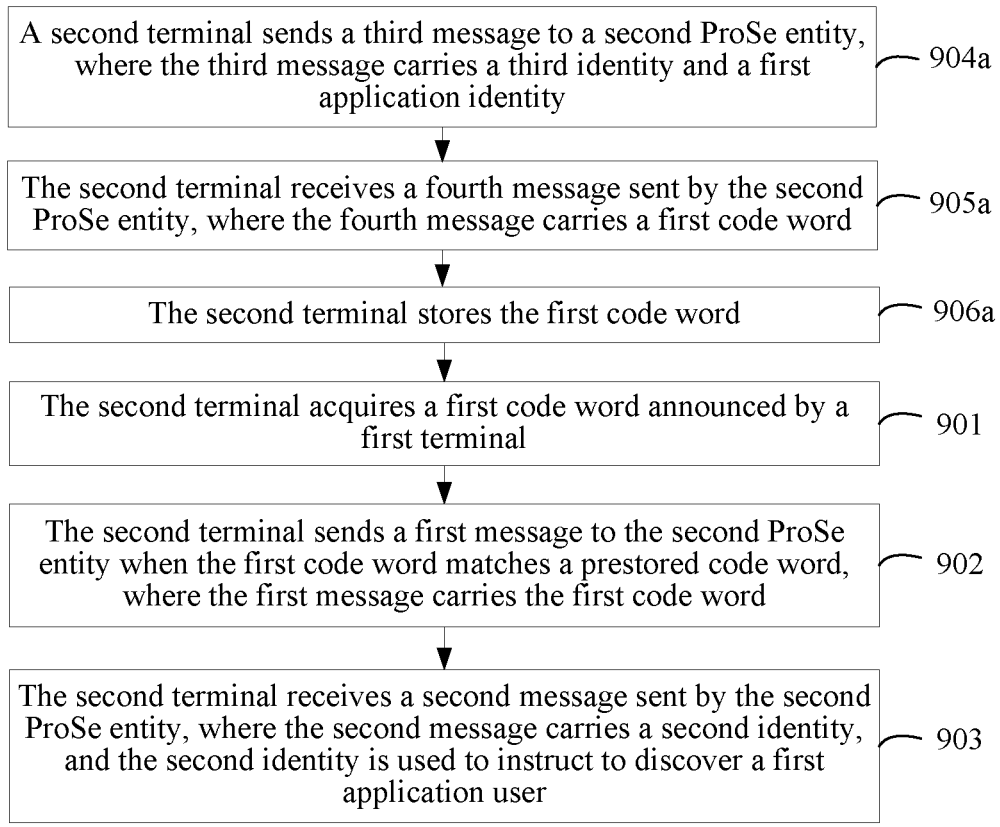
FIG. 10 is a schematic flowchart 9 of a ProSe information transmission method according to an embodiment of the present disclosure.

Further, as shown in FIG. 10, when the first code word matches the prestored code word, and before that a second terminal acquires a first code word (step 901), the ProSe information transmission method provided in this embodiment of the present disclosure may further include the following steps:

904*a*. The second terminal sends a third message to the second ProSe entity, where the third message carries a third identity and a first application identity.

905*a*. The second terminal receives a fourth message sent by the second ProSe entity, where the fourth message carries the first code word.

The first code word is determined by the second ProSe entity according to the third identity and the first application identity.

Specifically, the second ProSe entity may prestore a correspondence among the third identity, the first application identity, and a fourth identity. After acquiring the third identity and the first application identity, the second ProSe entity may determine the fourth identity according to the correspondence, further acquire a correspondence between a first identity and the second identity from an application server according to the fourth identity, and further acquire the first code word from a first ProSe entity according to the first identity, which is not specifically limited in this embodiment of the present disclosure.

906*a*. The second terminal stores the first code word.

Figure 11:
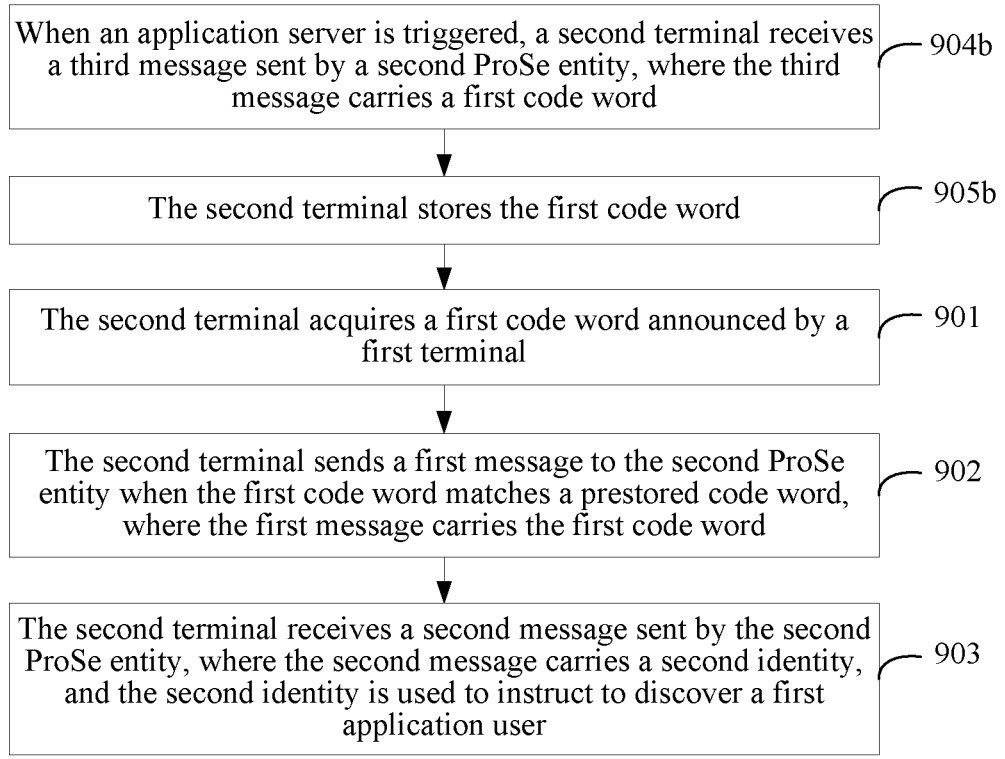
FIG. 11 is a schematic flowchart 10 of a ProSe information transmission method according to an embodiment of the present disclosure.

Optionally, as shown in FIG. 11, before that a second terminal acquires a first code word (step 901), the ProSe information transmission method provided in this embodiment of the present disclosure may further include the following steps:

904*b*. When an application server is triggered, the second terminal receives a third message sent by the second ProSe entity, where the third message carries the first code word.

905*b*. The second terminal stores the first code word.

Specifically, because the second terminal may store the first code word in step 906a and step 905b, after obtaining, by means of monitoring, the first code word broadcast by the first terminal, the second terminal may determine, according to the stored code word, that the first code word matches the prestored code word.

Certainly, after step 904b, the second terminal may further send a fourth message to the second ProSe entity, where the fourth message is a response message of the third message. In this way, the second ProSe entity may determine, according to the fourth message, that the second terminal has acquired the first code word. Therefore, accuracy and reliability of ProSe information transmission is ensured.

For related denotations of names such as the first terminal, the second terminal, the first code word, the first ProSe entity, the second ProSe entity, the first application identity, the first application user, the second identity, and the third identity in this embodiment of the present disclosure, reference may be made to the foregoing unified illustration part, and details are not repeatedly described in this embodiment of the present disclosure.

Based on the foregoing ProSe information transmission method provided in this embodiment of the present disclosure, in one aspect, after a second terminal acquires a first code word broadcast by a first terminal, and when the first code word matches a prestored code word, the second terminal further sends, to a second ProSe entity, a first message that carries the first code word. In this way, the second ProSe entity can determine a second identity according to the first code word, where the second identity is used to instruct to discover a first application user. It may be learned that, the second ProSe entity can learn an event that a second application user discovers the first application user, and further a first ProSe entity can also learn the event that the second application user discovers the first application user. That is, a network can learn an event that two application users discover each other, which is therefore favorable to expense settlement of an operator and monitoring of a network event. In another aspect, in a ProSe information transmission process, a terminal identity in the prior art is replaced with a temporary terminal identity, and an application user identity in the prior art is replaced with a temporary application user identity, that is, information carried in a process of 3GPP communication between a terminal and a ProSe entity is corresponding information temporarily allocated by the ProSe entity or an application server, and does not belong to personal privacy. Therefore, there is no potential security problem in transmission at a 3GPP layer, and the application server may support this transmission manner.

Figure 12:
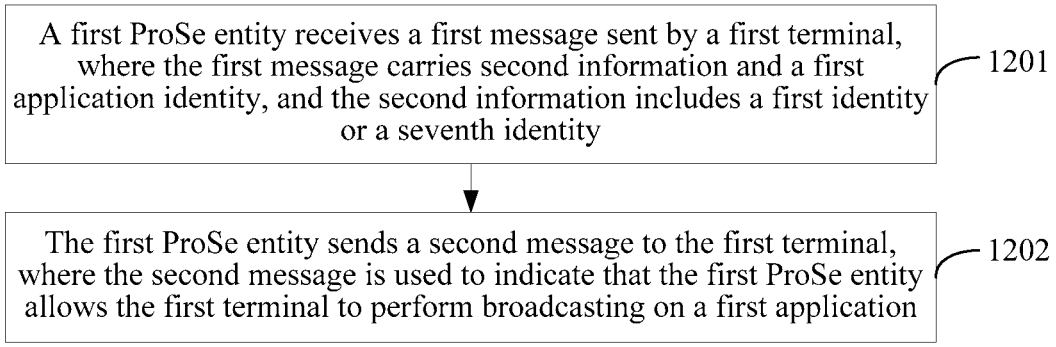
FIG. 12 is a schematic flowchart 11 of a ProSe information transmission method according to an embodiment of the present disclosure.

This embodiment of the present disclosure further provides a ProSe information transmission method, which is specifically shown in FIG. 12, and includes the following steps:

1201. A first ProSe entity receives a first message sent by a first terminal, where the first message carries second information and a first application identity, and the second information includes a first identity or a seventh identity.

1202. The first ProSe entity sends a second message to the first terminal, where the second message is used to indicate that the first ProSe entity allows the first terminal to perform broadcasting on a first application.

Specifically, after receiving the first message sent by the first terminal, the first ProSe entity may determine, according to the second information in the first message, whether to allow the first terminal to perform broadcasting on the first application, which is not specifically limited in this embodiment of the present disclosure.

In a possible implementation manner, if the second information includes the seventh identity, after that a first ProSe entity receives a first message sent by a first terminal (step 1201), and before that the first ProSe entity sends a second message to the first terminal (step 1202), the method may further include:

the first ProSe entity allocates the first identity and a fourth code word to the first terminal; and that the first ProSe entity sends a second message to the first terminal (step 1202) may specifically include:

a second ProSe entity sends the second message to the first terminal, where the second message carries the first identity and the fourth code word.

That is, in this embodiment of the present disclosure, the fourth code word broadcast by the first terminal may be allocated to the first terminal by the first ProSe entity in a registration process of the first terminal, or may be allocated to the first terminal by the first ProSe entity in a broadcast process of the first terminal, which is not specifically limited in this embodiment of the present disclosure.

Further, the first message may further carry a second identity, after that a first ProSe entity receives a first message sent by a first terminal (step 1201), and before that the first ProSe entity sends a second message to the first terminal (step 1202), the method may further include:

the first ProSe entity sends a third message to a first application server, where the third message carries the first identity and the second identity; and the first ProSe entity receives a fourth message sent by the first application server, where the fourth message is used to indicate that the first application server allows the first terminal to perform broadcasting on the first application.

In a possible implementation manner, the first message may further carry the second identity.

If the second information includes the first identity, after that a first ProSe entity receives a first message sent by a first terminal (step 1201), and before that the first ProSe entity sends a second message to the first terminal (step 1202), the method may further include:

the first ProSe entity sends a third message to a first application server, where the third message carries the second identity; and the first ProSe entity receives a fourth message sent by the first application server, where the fourth message is used to indicate that the first application server allows the first terminal to perform broadcasting on the first application.

In a possible implementation manner, if the second information includes the first identity, after that a first ProSe entity receives a first message sent by a first terminal (step 1201), and before that the first ProSe entity sends a second message to the first terminal (step 1202), the method may further include:

the first ProSe entity sends a third message to a first application server, where the third message carries the first identity; and the first ProSe entity receives a fourth message sent by the first application server, where the fourth message is used to indicate that the first application server allows the first terminal to perform broadcasting on the first application.

Optionally, the foregoing fourth message may further carry the second identity, and after that the first ProSe entity receives a fourth message sent by the first application server, the method may further include:

storing, by the first ProSe entity, the second identity.

This is not specifically limited in this embodiment of the present disclosure.

Further, the fourth message in this embodiment of the present disclosure may further carry a third identity, and the first ProSe entity may further store the third identity, which is not specifically limited in this embodiment of the present disclosure.

Figure 13:
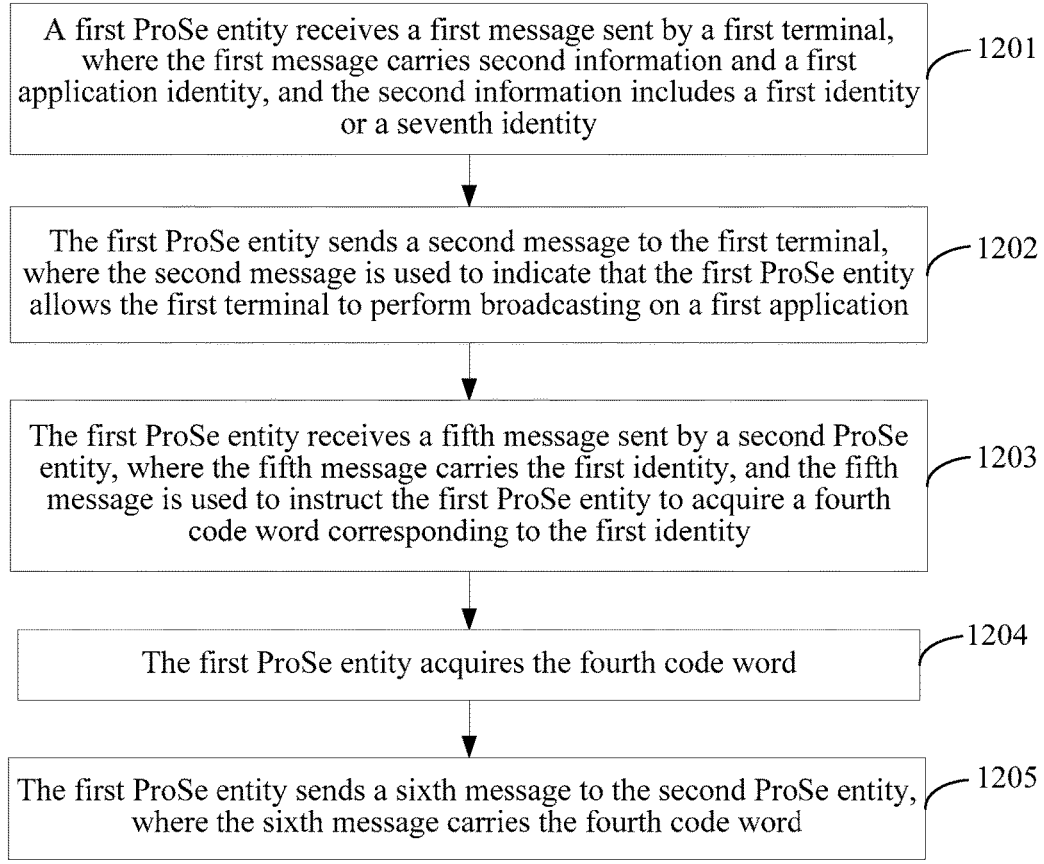
FIG. 13 is a schematic flowchart 12 of a ProSe information transmission method according to an embodiment of the present disclosure.

Further, as shown in FIG. 13, after that the first ProSe entity sends a second message to the first terminal (step 1202), the method may further include the following steps:

1203. The first ProSe entity receives a fifth message sent by a second ProSe entity, where the fifth message carries the first identity, and the fifth message is used to instruct the first ProSe entity to acquire a fourth code word corresponding to the first identity.

1204. The first ProSe entity acquires the fourth code word.

1205. The first ProSe entity sends a sixth message to the second ProSe entity, where the sixth message carries the fourth code word.

Optionally, the fifth message may further carry the third identity.

After that the first ProSe entity receives a fifth message sent by a second ProSe entity (step 1203), the method may further include:

the first ProSe entity stores the third identity.

This is not specifically limited in this embodiment of the present disclosure.

Figure 14:
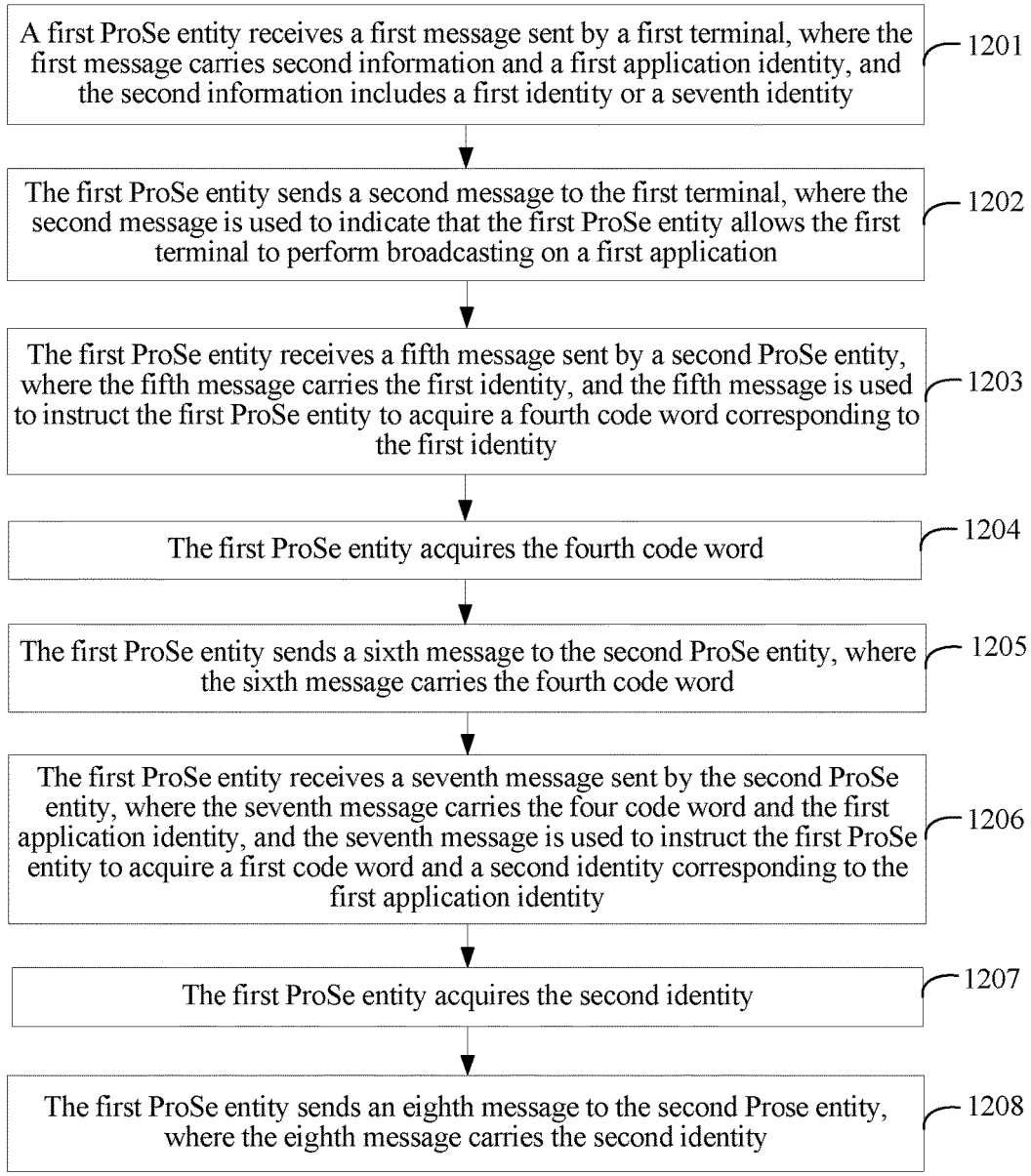
FIG. 14 is a schematic flowchart 13 of a ProSe information transmission method according to an embodiment of the present disclosure.

Further, as shown in FIG. 14, after that the first ProSe entity sends a second message to the first terminal (step 1202), the method may further include the following steps:

1206. The first ProSe entity receives a seventh message sent by the second ProSe entity, where the seventh message carries the fourth code word and the first application identity, and the seventh message is used to instruct the first ProSe entity to acquire a first code word and a second identity corresponding to the first application identity.

1207. The first ProSe entity acquires the second identity.

1208. The first ProSe entity sends an eighth message to the second ProSe entity, where the eighth message carries the second identity.

Optionally, the eighth message may further carry the first application identity, where the first application identity is used to indicate the first application corresponding to the second identity, which is not specifically limited in this embodiment of the present disclosure.

Further, after that the first ProSe entity receives a seventh message sent by the second ProSe entity (step 1206), and before that the first ProSe entity sends an eighth message to the second ProSe entity (step 1208), the method may further include:

the first ProSe entity determines whether the second terminal is authorized to discover a first application user.

If the first ProSe entity determines that the second terminal is authorized to discover the first application user, step 1208 is performed.

That is, before sending the eighth message to the second ProSe entity, the first ProSe entity further needs to first determine whether the second terminal is authorized to discover the first application user. After determining that the second terminal is authorized to discover the first application user, the first ProSe entity sends the eighth message to the second terminal, which further ensures validity of a monitoring process, and therefore ensures network security.

In a possible implementation manner, that the first ProSe entity determines whether the second terminal is authorized to discover a first application user may specifically include:

the first ProSe entity determines whether to store the third identity; and if the first ProSe entity determines to store the third identity, the first ProSe entity determines that the second terminal is authorized to discover the first application user.

That is, if the first ProSe entity stores the third identity in the monitoring process, it may be determined, according to the third identity and in a matching process, that the second terminal is authorized to discover the first application user.

In a possible implementation manner, the seventh message carries the third identity, where the third identity is used by the first ProSe entity to determine whether the second terminal is authorized to discover the first application user.

Further, the fourth code word is further used by the first ProSe entity to determine the first identity, and after that the first ProSe entity receives a seventh message sent by the second ProSe entity (step 1206), and before that the first ProSe entity sends an eighth message to the second ProSe entity (step 1208), the method may further include:

the first ProSe entity sends a ninth message to the first application server, where the ninth message carries the first identity; and the first ProSe entity receives a tenth message sent by the first application server, where the tenth message is used to indicate that the first application server allows the first terminal to perform broadcasting on the first application.

That is, before sending the eighth message to the second ProSe entity, the first ProSe entity may further interact with the first application server, so that whether broadcasting performed on the first application by the first terminal is valid is determined by using the first application server. After the first application server allows the first terminal to perform broadcasting on the first application, the eighth message is sent to the second ProSe entity, which further ensures validity of a broadcast process, and therefore ensures network security.

For related denotations of names such as the first ProSe entity, the second ProSe entity, the first terminal, the second terminal, the first identity, the fourth code word, the seventh identity, the first application server, the third identity, the first application identity, the second identity, and the first application user in this embodiment of the present disclosure, reference may be made to the foregoing unified illustration part, and details are not repeatedly described herein.

Based on the foregoing ProSe information transmission method provided in this embodiment of the present disclosure, in one aspect, in a broadcast process of a first terminal, a first ProSe entity may receive a first message sent by the first terminal. In this way, the first ProSe entity can acquire an event that the first terminal performs broadcast, which is therefore favorable to expense settlement of an operator and monitoring of a network event. In another aspect, in a ProSe information transmission process, a terminal identity in the prior art is replaced with a temporary terminal identity, and an application user identity in the prior art is replaced with a temporary application user identity, that is, information carried in a process of 3GPP communication between a terminal and a ProSe entity is corresponding information temporarily allocated by the ProSe entity or an application server, and does not belong to personal privacy. Therefore, there is no potential security problem in transmission at a 3GPP layer, and the application server may support this transmission manner.

Figure 15:
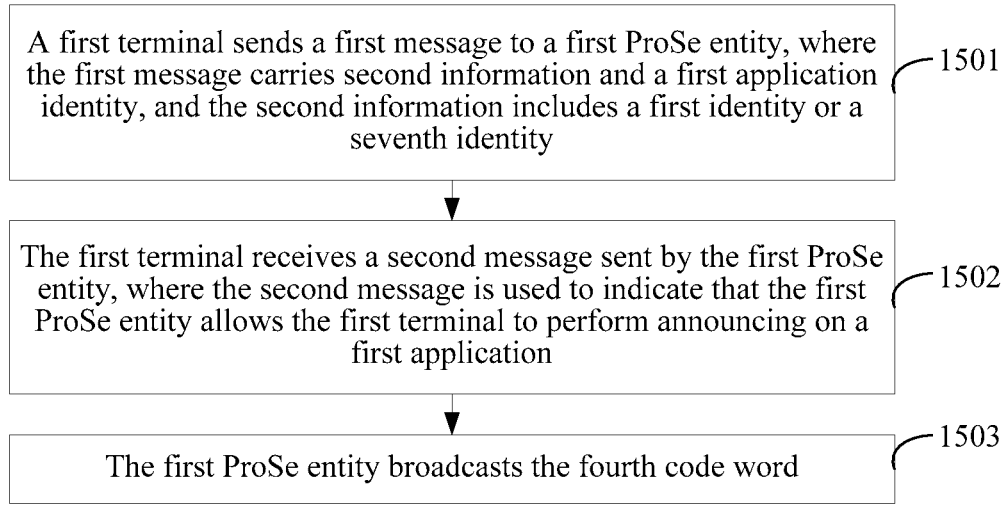
FIG. 15 is a schematic flowchart 14 of a ProSe information transmission method according to an embodiment of the present disclosure.

This embodiment of the present disclosure further provides a ProSe information transmission method, which is specifically shown in FIG. 15, and includes the following steps:

1501. A first terminal sends a first message to a first ProSe entity, where the first message carries second information and a first application identity, and the second information includes a first identity or a seventh identity.

1502. The first terminal receives a second message sent by the first ProSe entity, where the second message is used to indicate that the first ProSe entity allows the first terminal to perform broadcasting on a first application.

1503. The first ProSe entity broadcasts a fourth code word.

Optionally, the first message may further carry a second identity, which is not specifically limited in this embodiment of the present disclosure.

The second identity is used to indicate a first application user of the first terminal.

Further, if the second information includes the seventh identity, the second message may further carry the fourth code word and the first identity, which is not specifically limited in this embodiment of the present disclosure.

It should be noted that, in this embodiment of the present disclosure, the fourth code word broadcast by the first terminal may be allocated to the first terminal by the first ProSe entity in a registration process of the first terminal, or may be allocated to the first terminal by the first ProSe entity in a broadcast process of the first terminal, which is not specifically limited in this embodiment of the present disclosure.

For related denotations of names such as the first terminal, the first ProSe entity, the first application identity, the first identity, the seventh identity, the fourth code word, and the second identity in this embodiment of the present disclosure, reference may be made to the foregoing unified illustration part, and details are not repeatedly described in this embodiment of the present disclosure.

Based on the foregoing ProSe information transmission method provided in this embodiment of the present disclosure, in one aspect, in a broadcast process of a first terminal, the first terminal sends a first message to a first ProSe entity. In this way, the first ProSe entity can acquire an event that the first terminal performs broadcast, which is therefore favorable to expense settlement of an operator and monitoring of a network event. In another aspect, in a ProSe information transmission process, a terminal identity in the prior art is replaced with a temporary terminal identity, and an application user identity in the prior art is replaced with a temporary application user identity, that is, information carried in a process of 3GPP communication between a terminal and a ProSe entity is corresponding information temporarily allocated by the ProSe entity or an application server, and does not belong to personal privacy. Therefore, there is no potential security problem in transmission at a 3GPP layer, and the application server may support this transmission manner.

Embodiment 2

Figure 16:
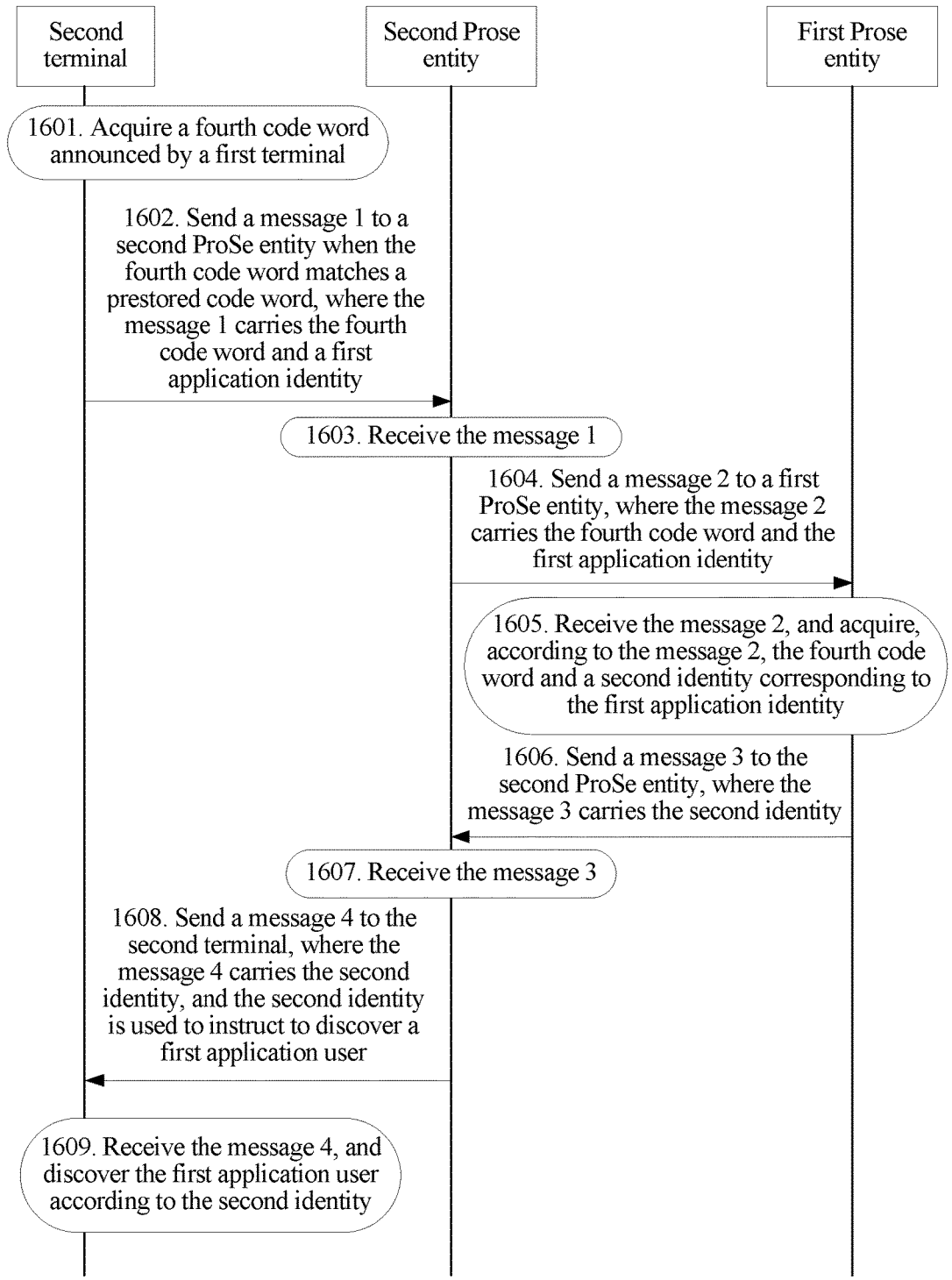
FIG. 16 is a schematic interworking diagram 1 of a ProSe information transmission method according to an embodiment of the present disclosure.

This embodiment of the present disclosure provides a ProSe information transmission method, which is specifically described by using interaction between a first terminal, a second terminal, a first ProSe entity, a second ProSe entity, and a first application server as an example. As shown in FIG. 16, the method includes the following steps:

1601. The second terminal acquires a fourth code word broadcast by the first terminal.

1602. The second terminal sends a message 1 to the second ProSe entity when the fourth code word matches a prestored code word, where the message 1 carries the fourth code word and a first application identity.

1603. The second ProSe entity receives the message 1.

1604. The second ProSe entity sends a message 2 to the first ProSe entity, where the message 2 carries the fourth code word and the first application identity.

1605. The first ProSe entity receives the message 2, and acquires, according to the message 2, the fourth code word and a second identity corresponding to the first application identity.

1606. The first ProSe entity sends a message 3 to the second ProSe entity, where the message 3 carries the second identity.

Optionally, the message 3 may further carry the first application identity, where the first application identity is used to indicate a first application corresponding to the second identity, which is not specifically limited in this embodiment of the present disclosure.

1607. The second ProSe entity receives the message 3.

1608. The second ProSe entity sends a message 4 to the second terminal, where the message 4 carries the second identity, and the second identity is used to instruct to discover a first application user.

That is, the second identity is used to indicate that the first application user is near the second terminal.

Optionally, the message 4 may further carry the first application identity, where the first application identity is used to indicate the first application corresponding to the second identity, which is not specifically limited in this embodiment of the present disclosure.

It should be noted that steps 1604 to 1608 is merely a possible implementation manner in which the second ProSe entity acquires the second identity according to the fourth code word and the first application identity. Alternatively, after receiving the message 1, the second ProSe entity may directly acquire the second identity according to the fourth code word and the first application identity that are carried in the message 1 and with reference to a prestored correspondence among the fourth code word, the first application identity, and the second identity; or the second identity may be acquired by using other steps, which is not specifically limited in this embodiment of the present disclosure.

1609. The second terminal receives the message 4, and discovers the first application user according to the second identity.

That is, after receiving the message 4, the second terminal confirms, according to the second identity, that the first application user is near the second terminal.

For a specific implementation manner of steps 1601 to 1609, reference may be made to related descriptions of corresponding steps in Embodiment 1, and details are not repeatedly described in this embodiment of the present disclosure.

It should be noted that, after that the first ProSe entity receives the message 2, and acquires, according to the message 2, the fourth code word and a second identity corresponding to the first application identity (step 1605), and before that the first ProSe entity sends a message 3 to the second ProSe entity, where the message 3 carries the second identity (step 1606), the first ProSe entity may further first determine whether the second terminal is authorized to discover the first application user. For specific implementation, reference may be made to a description on a side of the first ProSe entity in Embodiment 1, and details are not repeatedly described herein.

Figure 17:
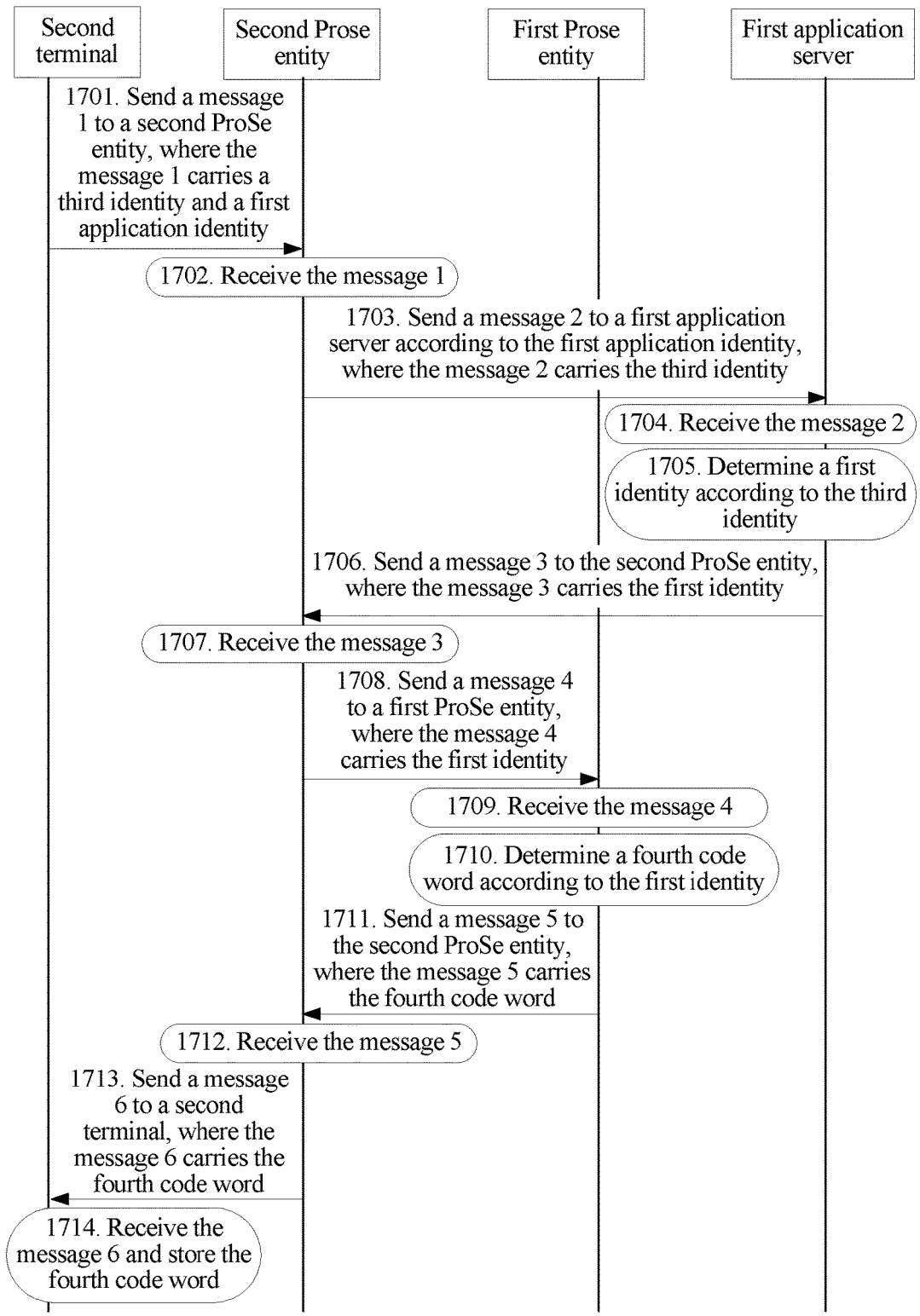
FIG. 17 is a schematic interworking diagram 2 of a ProSe information transmission method according to an embodiment of the present disclosure.

Further, as shown in FIG. 17, before that the second terminal acquires a fourth code word broadcast by the first terminal (step 1601), the ProSe information transmission method provided in this embodiment of the present disclosure may further include the following monitoring process:

1701. The second terminal sends a message 1 to the second ProSe entity, where the message 1 carries a third identity and the first application identity.

1702. The second ProSe entity receives the message 1.

1703. The second ProSe entity sends a message 2 to the first application server according to the first application identity, where the message 2 carries the third identity.

1704. The first application server receives the message 2.

1705. The first application server determines a first identity according to the third identity.

Optionally, the first application server may further determine the second identity according to the third identity.

1706. The first application server sends a message 3 to the second ProSe entity, where the message 3 carries the first identity.

1707. The second ProSe entity receives the message 3.

Optionally, the first application server may further determine the second identity according to the third identity, and the message 3 may further carry the second identity, so that the second ProSe entity stores the second identity, which is not specifically limited in this embodiment of the present disclosure.

1708. The second ProSe entity sends a message 4 to the first ProSe entity, where the message 4 carries the first identity.

1709. The first ProSe entity receives the message 4.

1710. The first ProSe entity determines the fourth code word according to the first identity.

Optionally, the message 4 may further carry the third identity, so that after receiving the message 4, the first ProSe entity stores the third identity, which is not specifically limited in this embodiment of the present disclosure.

1711. The first ProSe entity sends a message 5 to the second ProSe entity, where the message 5 carries the fourth code word.

1712. The second ProSe entity receives the message 5.

1713. The second ProSe entity sends a message 6 to the second terminal, where the message 6 carries the fourth code word.

1714. The second terminal receives the message 6 and stores the fourth code word.

For a specific implementation manner of steps 1701 to 1714, reference may be made to related descriptions of corresponding steps in Embodiment 1, and details are not repeatedly described in this embodiment of the present disclosure.

Figure 18:
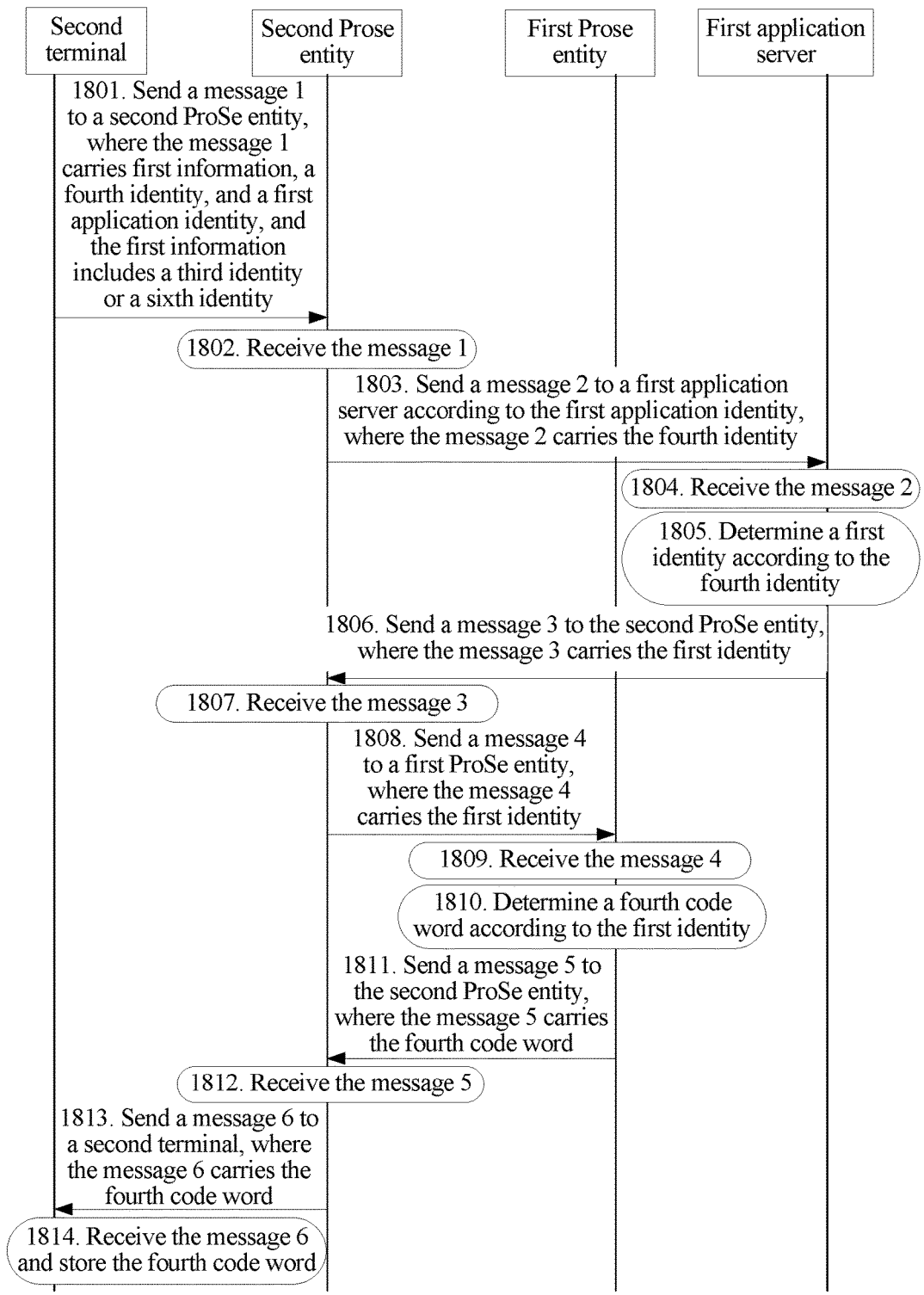
FIG. 18 is a schematic interworking diagram 3 of a ProSe information transmission method according to an embodiment of the present disclosure.

Optionally, as shown in FIG. 18, before that the second terminal acquires a fourth code word broadcast by the first terminal (step 1601), the ProSe information transmission method provided in this embodiment of the present disclosure may further include the following monitoring process:

1801. The second terminal sends a message 1 to the second ProSe entity, where the message 1 carries first information, a fourth identity, and the first application identity, and the first information includes a third identity or a sixth identity.

1802. The second ProSe entity receives the message 1.

1803. The second ProSe entity sends a message 2 to the first application server according to the first application identity, where the message 2 carries the fourth identity.

1804. The first application server receives the message 2.

Optionally, if the first information includes the sixth identity, the second ProSe entity may further allocate the third identity to the second terminal, and the message 2 may further carry the third identity, so that the first application server stores the third identity, which is not specifically limited in this embodiment of the present disclosure.

1805. The first application server determines a first identity according to the third identity.

1806. The first application server sends a message 3 to the second ProSe entity, where the message 3 carries the first identity.

1807. The second ProSe entity receives the message 3.

Optionally, the first application server may further determine the second identity according to the third identity, and the message 3 may further carry the second identity, so that the second ProSe entity stores the second identity, which is not specifically limited in this embodiment of the present disclosure.

1808. The second ProSe entity sends a message 4 to the first ProSe entity, where the message 4 carries the first identity.

1809. The first ProSe entity receives the message 4.

1810. The first ProSe entity determines the fourth code word according to the first identity.

Optionally, the message 4 may further carry the third identity, so that after receiving the message 4, the first ProSe entity stores the third identity, which is not specifically limited in this embodiment of the present disclosure.

1811. The first ProSe entity sends a message 5 to the second ProSe entity, where the message 5 carries the fourth code word.

1812. The second ProSe entity receives the message 5.

1813. The second ProSe entity sends a message 6 to the second terminal, where the message 6 carries the fourth code word.

1814. The second terminal receives the message 6 and stores the fourth code word.

For a specific implementation manner of steps 1701 to 1714, reference may be made to related descriptions of corresponding steps in Embodiment 1, and details are not repeatedly described in this embodiment of the present disclosure.

Figure 19:
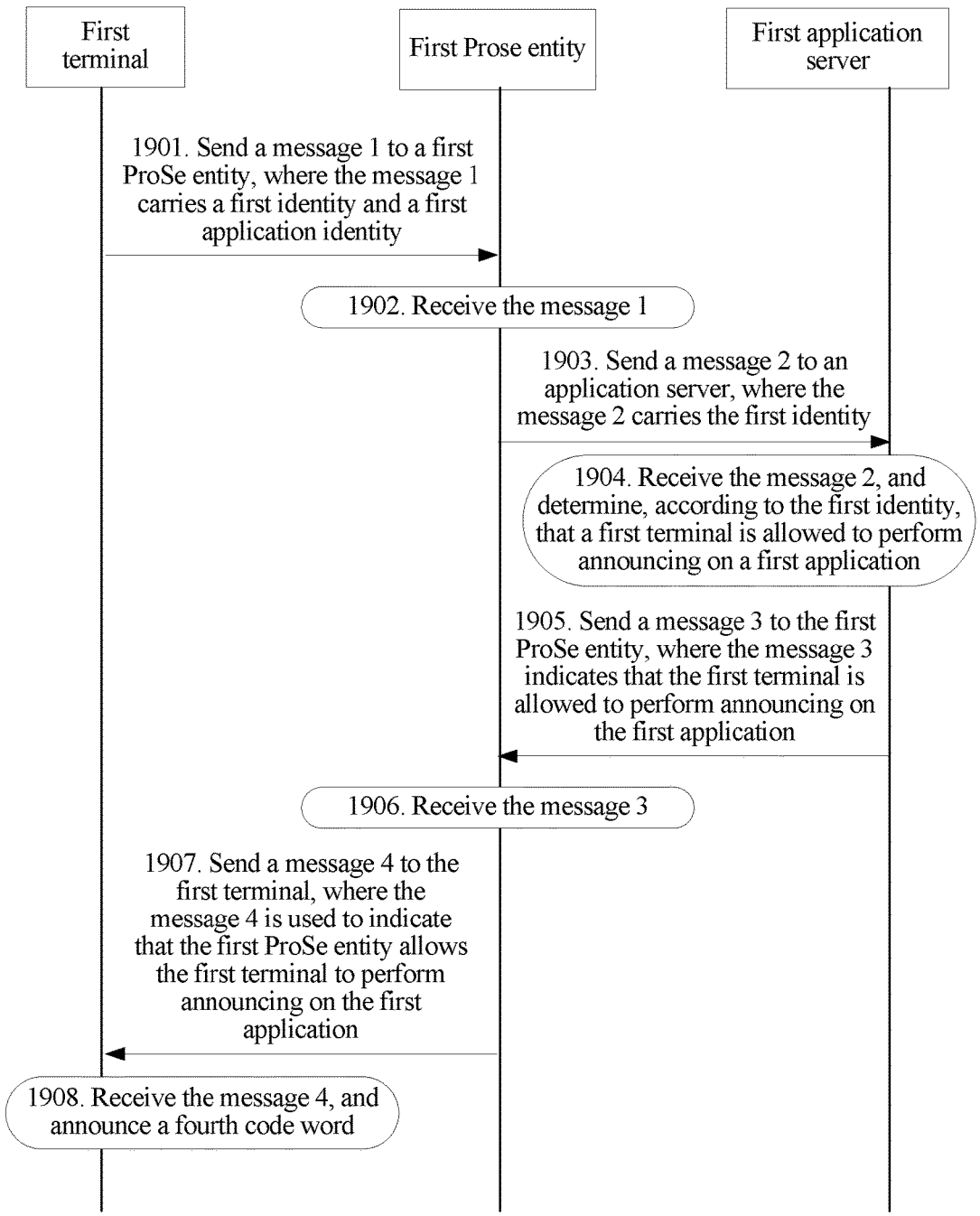
FIG. 19 is a schematic interworking diagram 4 of a ProSe information transmission method according to an embodiment of the present disclosure.

Further, as shown in FIG. 19, before that the second terminal acquires a fourth code word broadcast by the first terminal (step 1601), the ProSe information transmission method provided in this embodiment of the present disclosure may further include the following broadcast process:

1901. The first terminal sends a message 1 to the first ProSe entity, where the message 1 carries a first identity and the first application identity.

1902. The first ProSe entity receives the message 1.

1903. The first ProSe entity sends a message 2 to the first application server, where the message 2 carries the first identity.

1904. The first application server receives the message 2, and determines, according to the first identity, that the first terminal is allowed to perform broadcasting on a first application.

1905. The first application server sends a message 3 to the first ProSe entity, where the message 3 is used to indicate that the first application server allows the first terminal to perform broadcast on the first application.

1906. The first ProSe entity receives the message 3.

1907. The first ProSe entity sends a message 4 to the first terminal, where the message 4 is used to indicate that the first ProSe entity allows the first terminal to perform broadcasting on the first application.

1908. The first terminal receives the message 4 and broadcasts the fourth code word.

For a specific implementation manner of steps 1901 to 1908, reference may be made to related descriptions of corresponding steps in Embodiment 1, and details are not repeatedly described in this embodiment of the present disclosure.

Figure 20:
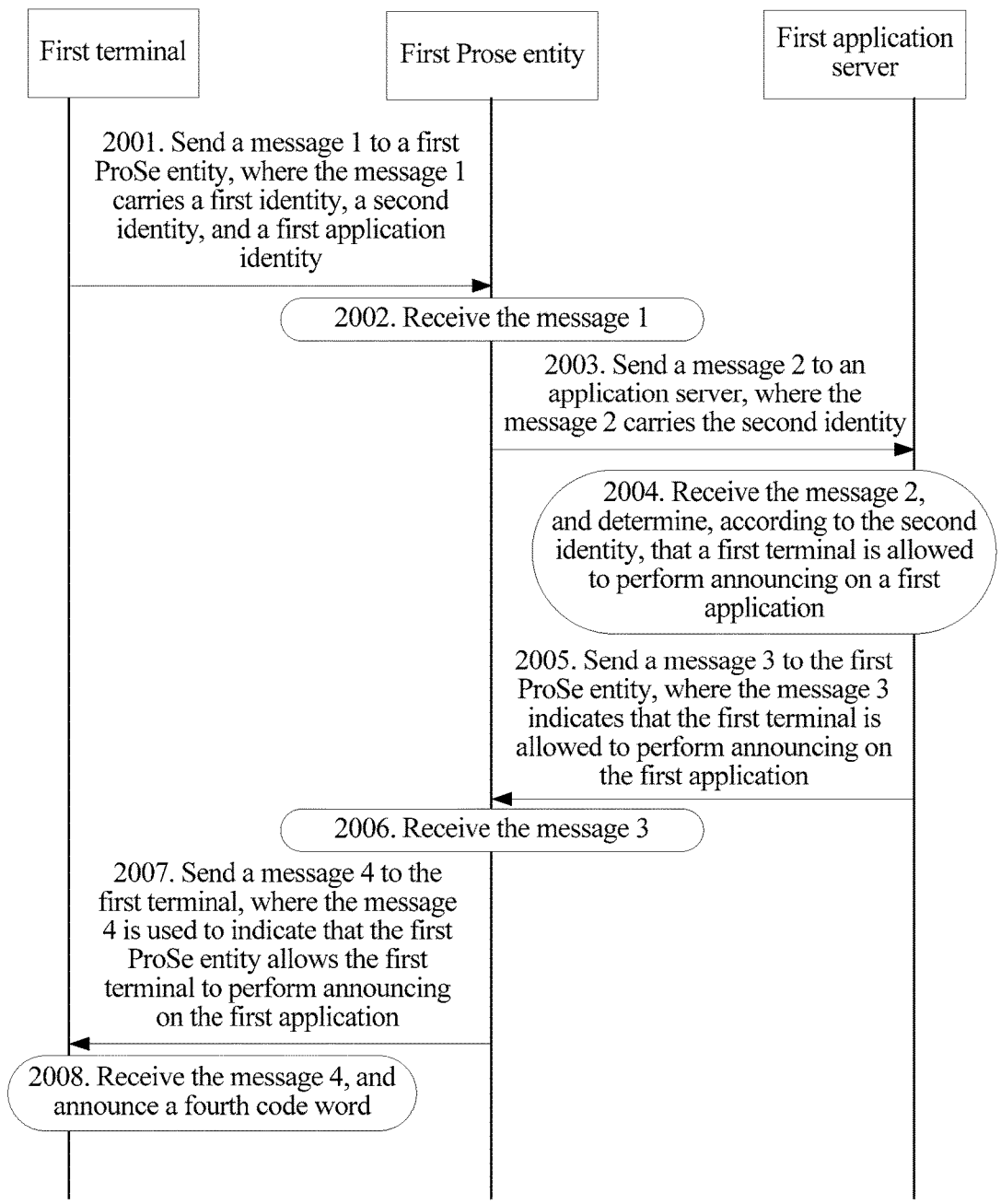
FIG. 20 is a schematic interworking diagram 5 of a ProSe information transmission method according to an embodiment of the present disclosure.

Optionally, as shown in FIG. 20, before that the second terminal acquires a fourth code word broadcast by the first terminal (step 1601), the ProSe information transmission method provided in this embodiment of the present disclosure may further include the following broadcast process:

2001. The first terminal sends a message 1 to the first ProSe entity, where the message 1 carries a first identity, the second identity, and the first application identity.

2002. The first ProSe entity receives the message 1.

2003. The first ProSe entity sends a message 2 to the first application server, where the message 2 carries the second identity.

2004. The first application server receives the message 2, and determines, according to the second identity, that the first terminal is allowed to perform broadcasting on a first application.

2005. The first application server sends a message 3 to the first ProSe entity, where the message 3 is used to indicate that the first application server allows the first terminal to perform broadcasting on the first application.

2006. The first ProSe entity receives the message 3.

2007. The first ProSe entity sends a message 4 to the first terminal, where the message 4 is used to indicate that the first ProSe entity allows the first terminal to perform broadcasting on the first application.

2008. The first terminal receives the message 4 and broadcasts the fourth code word.

For a specific implementation manner of steps 2001 to 2008, reference may be made to related descriptions of corresponding steps in Embodiment 1, and details are not repeatedly described in this embodiment of the present disclosure.

Figure 21:
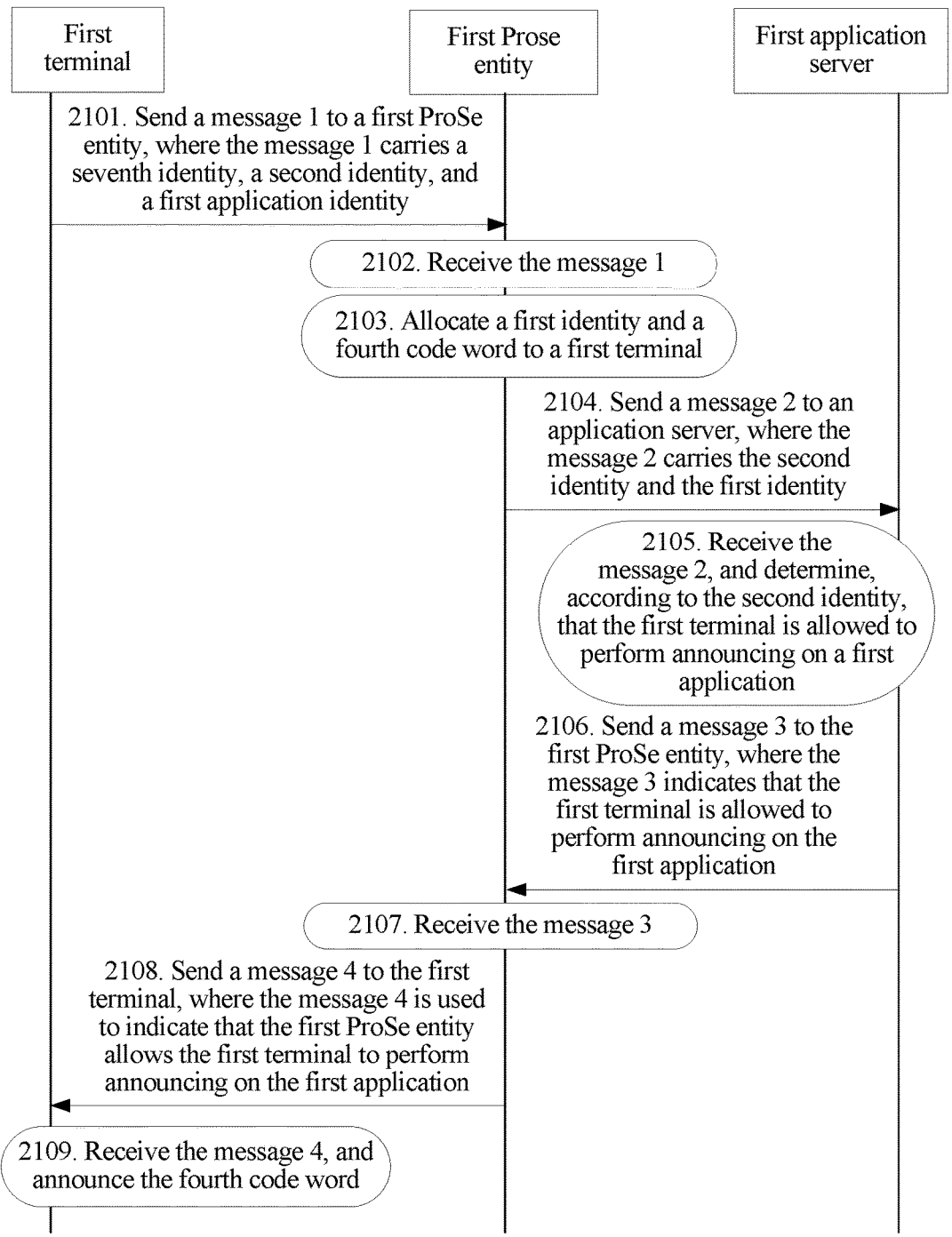
FIG. 21 is a schematic interworking diagram 6 of a ProSe information transmission method according to an embodiment of the present disclosure.

Optionally, as shown in FIG. 21, before that the second terminal acquires a fourth code word broadcast by the first terminal (step 1601), the ProSe information transmission method provided in this embodiment of the present disclosure may further include the following broadcast process:

2101. The first terminal sends a message 1 to the first ProSe entity, where the message 1 carries a seventh identity, the second identity, and the first application identity.

2102. The first ProSe entity receives the message 1.

2103. The first ProSe entity allocates a first identity and the fourth code word to the first terminal.

2104. The first ProSe entity sends a message 2 to the first application server, where the message 2 carries the second identity and the first identity.

2105. The first application server receives the message 2, and determines, according to the second identity, that the first terminal is allowed to perform broadcasting on a first application.

2106. The first application server sends a message 3 to the first ProSe entity, where the message 3 is used to indicate that the first application server allows the first terminal to perform broadcasting on the first application.

2107. The first ProSe entity receives the message 3.

2108. The first ProSe entity sends a message 4 to the first terminal, where the message 4 carries the fourth code word and is used to indicate that the first ProSe entity allows the first terminal to perform broadcasting on the first application.

2109. The first terminal receives the message 4 and broadcasts the fourth code word.

For a specific implementation manner of steps 2101 to 2109, reference may be made to related descriptions of corresponding steps in Embodiment 1, and details are not repeatedly described in this embodiment of the present disclosure.

This embodiment is a specific description of Embodiment 1; therefore, for technical effects that can be achieved in this embodiment, reference may be made to the foregoing descriptions, and details are not repeatedly described herein.

Embodiment 3

Figure 22A:
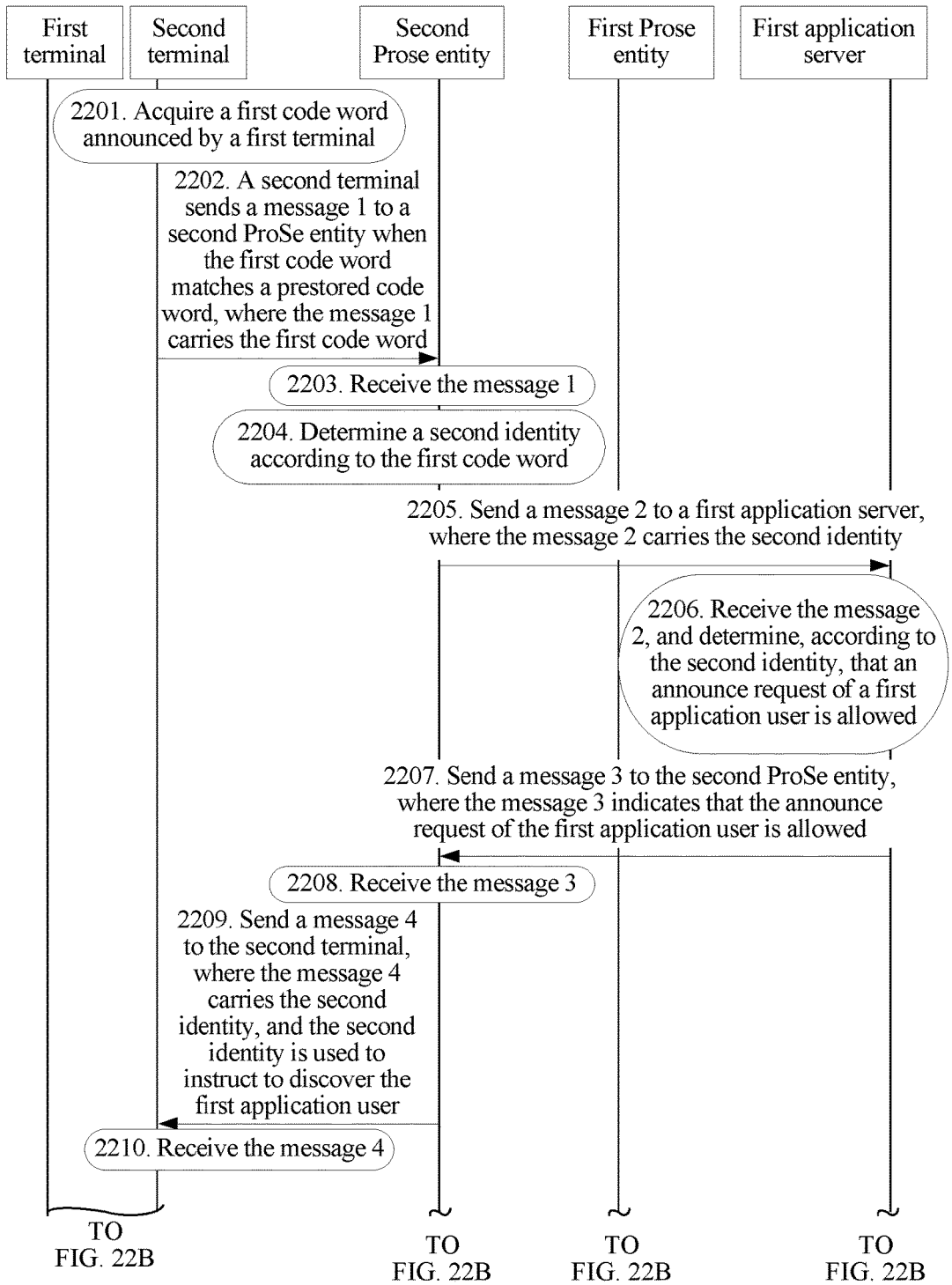
FIG. 22A illustrates a first part of a schematic interworking diagram 7 of a ProSe information transmission method according to an embodiment of the present disclosure.
Figure 22B:
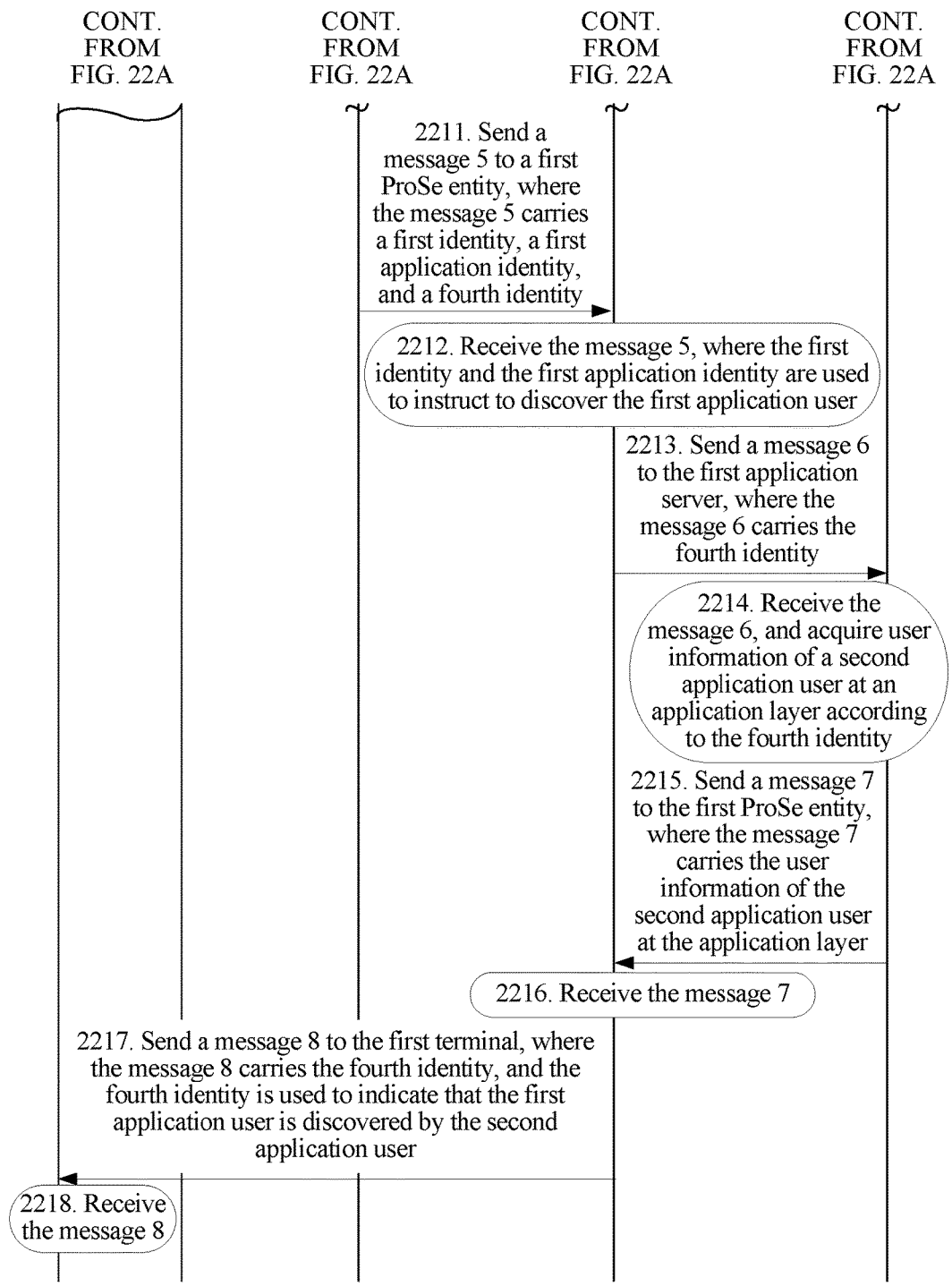
FIG. 22B illustrates a second part of a schematic interworking diagram 7 of a ProSe information transmission method according to an embodiment of the present disclosure.

This embodiment of the present disclosure provides a ProSe information transmission method, which is specifically described by using interaction between a first terminal, a second terminal, a first ProSe entity, a second ProSe entity, and a first application server as an example. As shown in FIG. 22A and FIG. 22B are, the method includes the following steps:

2201. The second terminal acquires a first code word broadcast by the first terminal.

2202. The second terminal sends a message 1 to the second ProSe entity when the first code word matches a prestored code word, where the message 1 carries the first code word.

2203. The second ProSe entity receives the message 1.

2204. The second ProSe entity determines a second identity according to the first code word.

2205. The first ProSe entity sends a message 2 to the first application server, where the message 2 carries the second identity.

2206. The first application server receives the message 2, and determines, according to the second identity, that an broadcast request of a first application user is allowed.

2207. The first application server sends a message 3 to the second ProSe entity, where the message 3 indicates that the broadcast request of the first application user is allowed.

2208. The second ProSe entity receives the message 3.

2209. The second ProSe entity sends a message 4 to the second terminal, where the message 4 carries the second identity, and the second identity is used to instruct to discover the first application user.

2210. The second terminal receives the message 4.

2211. The second ProSe entity sends a message 5 to the first ProSe entity, where the message 5 carries a first identity, a first application identity, and a fourth identity.

2212. The first ProSe entity receives the message 5, where the first identity and the first application identity are used to instruct to discover the first application user.

2213. The first ProSe entity sends a message 6 to the first application server, where the message 6 carries the fourth identity.

2214. The first application server receives the message 6, and acquires user information of a second application user at an application layer according to the fourth identity.

2215. The first application server sends a message 7 to the first ProSe entity, where the message 7 carries the user information of the second application user at the application layer.

2216. The first ProSe entity receives the message 7.

2217. The first ProSe entity sends a message 22 to the first terminal, where the message 22 carries the fourth identity, and the fourth identity is used to indicate that the first application user is discovered by the second application user.

2218. The first terminal receives the message 22.

For a specific implementation manner of steps 2201 to 2218, reference may be made to related descriptions of corresponding steps in Embodiment 1, and details are not repeatedly described in this embodiment of the present disclosure.

Figure 23A:
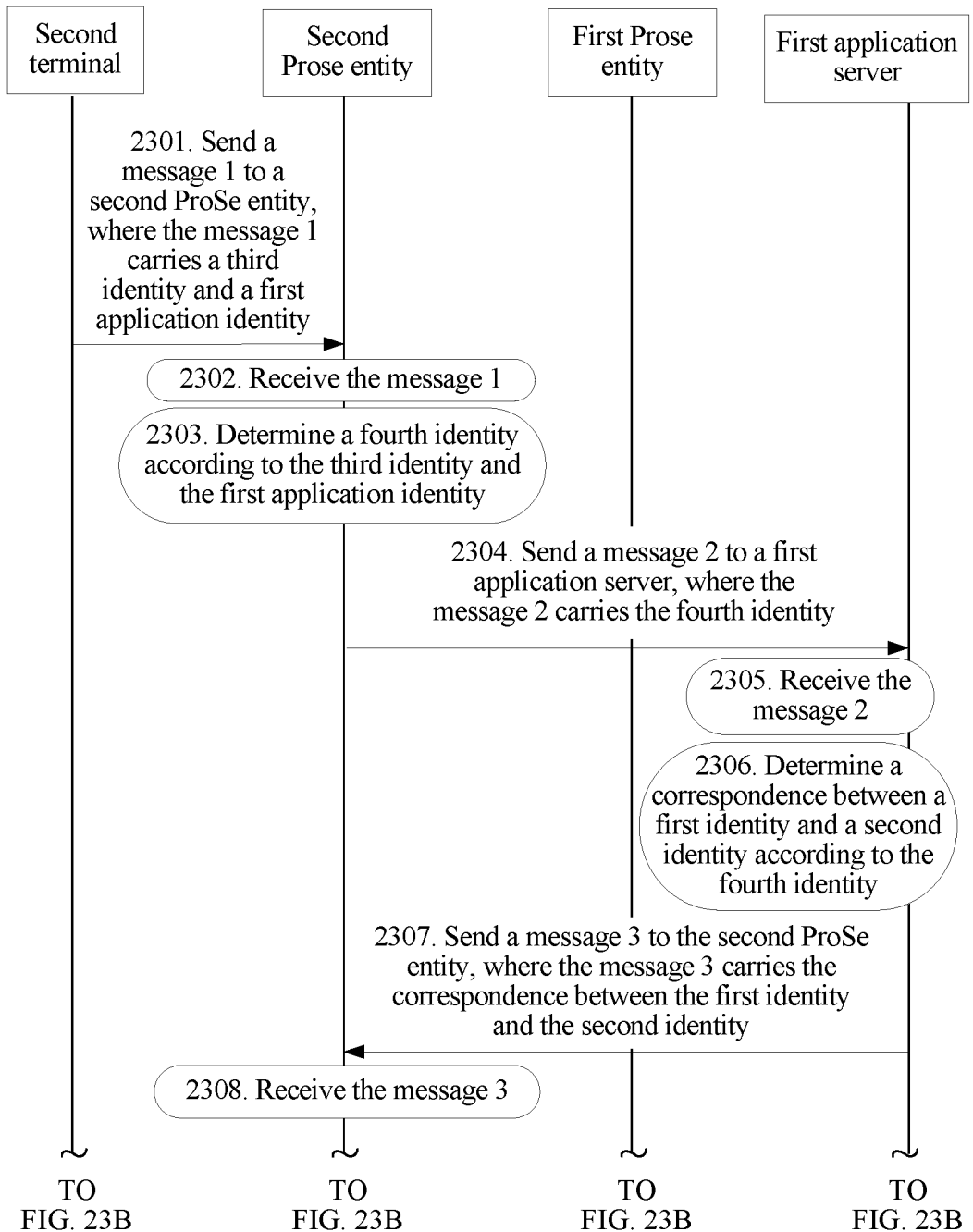
FIG. 23A illustrates a first part of a schematic interworking diagram 8 of a ProSe information transmission method according to an embodiment of the present disclosure.
Figure 23B:
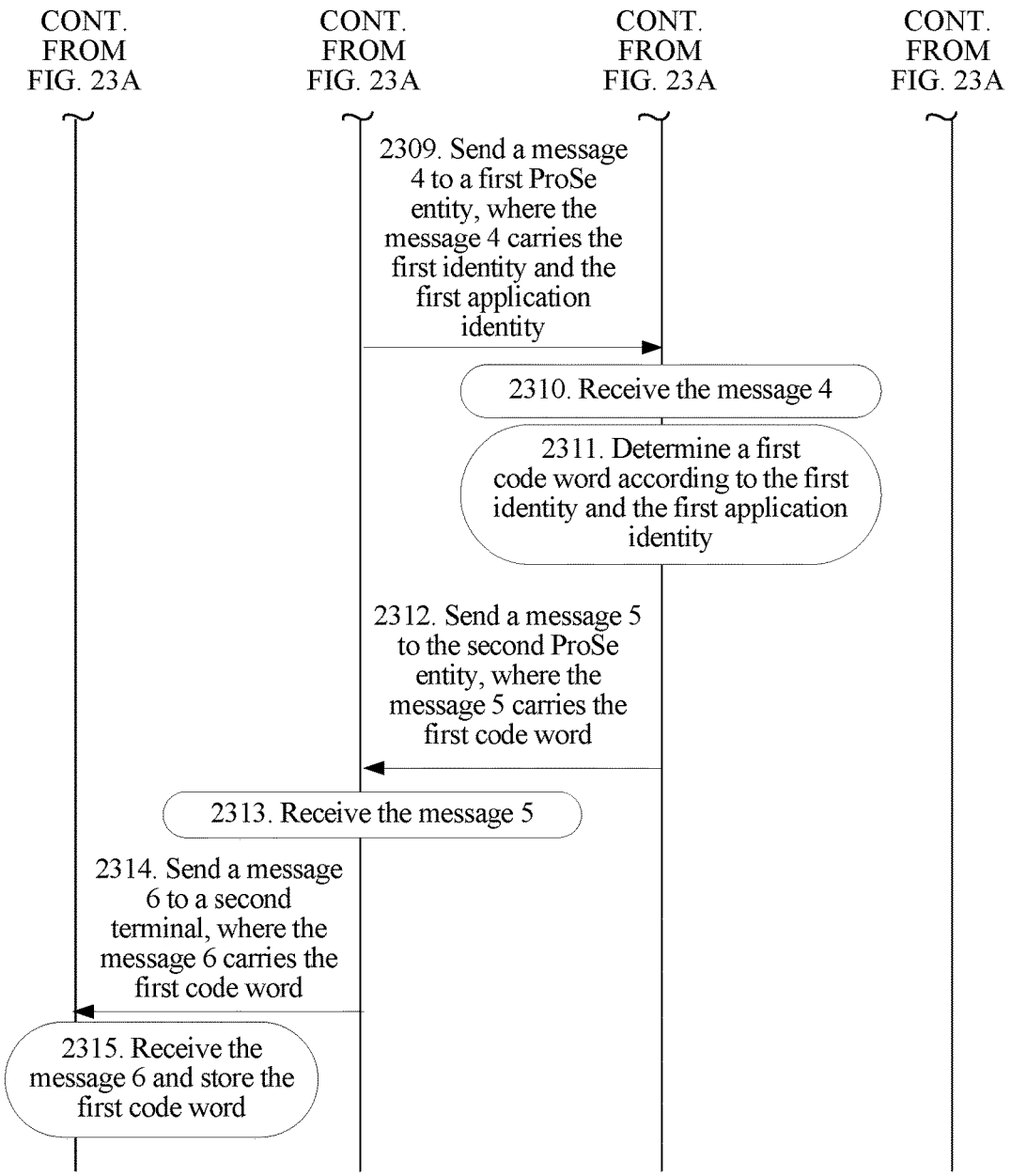
FIG. 23B illustrates a second part of a schematic interworking diagram 8 of a ProSe information transmission method according to an embodiment of the present disclosure.

Further, as shown in FIG. 23A and FIG. 23B, before that the second terminal acquires a first code word broadcast by the first terminal (step 2201), the ProSe information transmission method provided in this embodiment of the present disclosure may further include the following steps:

2301. The second terminal sends a message 1 to the second ProSe entity, where the message 1 carries a third identity and the first application identity.

2302. The second ProSe entity receives the message 1.

2303. The second ProSe entity determines the fourth identity according to the third identity and the first application identity.

2304. The second ProSe entity sends a message 2 to the first application server, where the message 2 carries the fourth identity.

2305. The first application server receives the message 2.

2306. The first application server determines a correspondence between the first identity and the second identity according to the fourth identity.

2307. The first application server sends a message 3 to the second ProSe entity, where the message 3 carries the correspondence between the first identity and the second identity.

2308. The second ProSe entity receives the message 3.

2309. The second ProSe entity sends a message 4 to the first ProSe entity, where the message 4 carries the first identity and the first application identity.

2310. The first ProSe entity receives the message 4.

2311. The first ProSe entity determines the first code word according to the first identity and the first application identity.

2312. The first ProSe entity sends a message 5 to the second ProSe entity, where the message 5 carries the first code word.

2313. The first ProSe entity receives the message 5.

2314. The first ProSe entity sends a message 6 to the second terminal, where the message 6 carries the first code word.

2315. The second terminal receives the message 6 and stores the first code word.

For a specific implementation manner of steps 2301 to 2315, reference may be made to related descriptions of corresponding steps in Embodiment 1, and details are not repeatedly described in this embodiment of the present disclosure.

Figure 24:
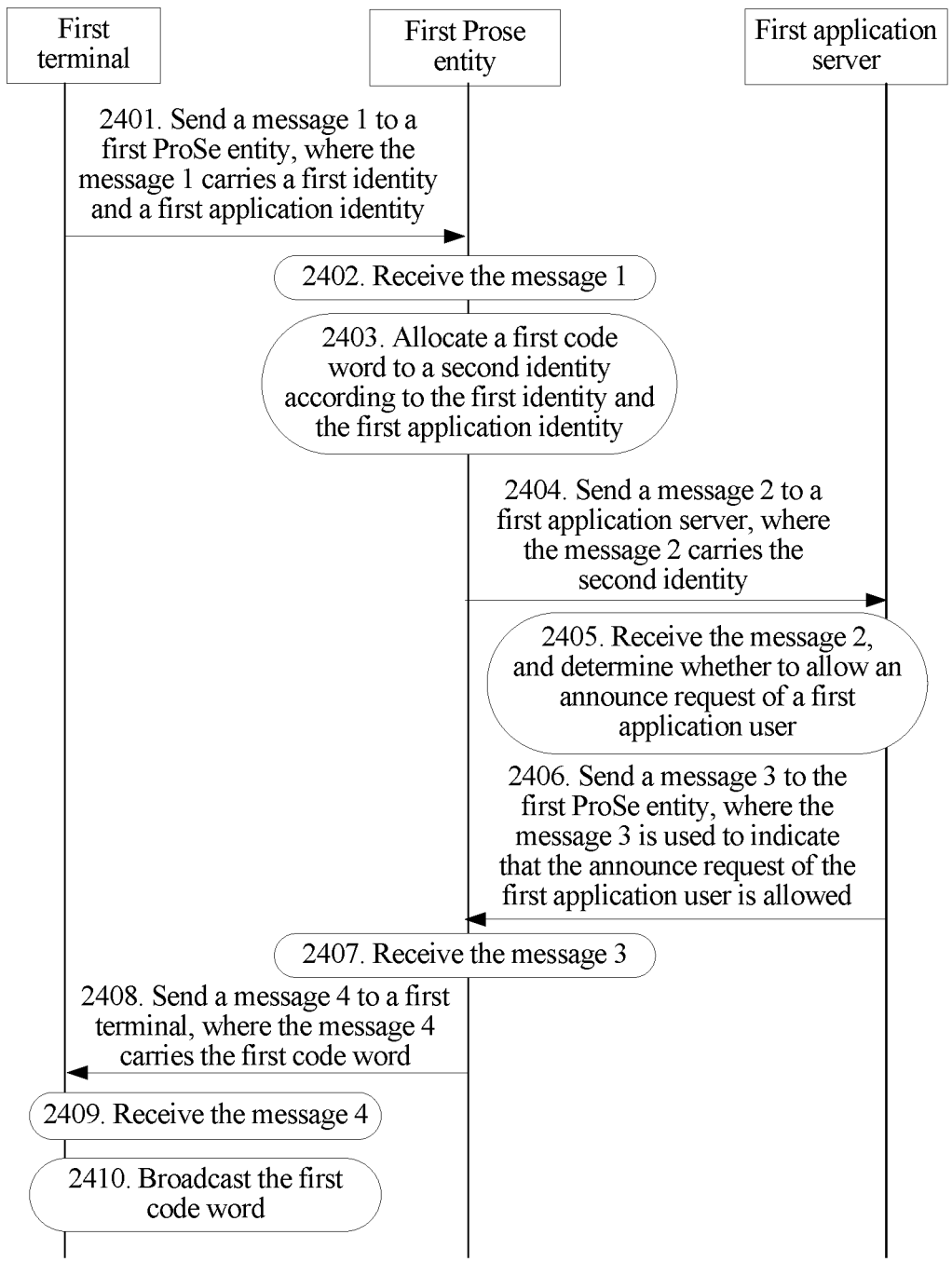
FIG. 24 is a schematic interworking diagram 9 of a ProSe information transmission method according to an embodiment of the present disclosure.

Further, as shown in FIG. 24, before that the second terminal acquires a first code word broadcast by the first terminal (step 2201), the ProSe information transmission method provided in this embodiment of the present disclosure may further include the following steps:

2401. The first terminal sends a message 1 to the first ProSe entity, where the message 1 carries the first identity and the first application identity.

2402. The first ProSe entity receives the message 1.

2403. The first ProSe entity allocates the first code word to the second identity according to the first identity and the first application identity.

2404. The first ProSe entity sends a message 2 to the first application server, where the message 2 carries the second identity.

2405. The first application server receives the message 2, and determines, according to the second identity, that the broadcast request of the first application user is allowed.

2406. The first application server sends a message 3 to the second ProSe entity, where the message 3 is used to indicate that the broadcast request of the first application user is allowed.

2407. The first ProSe entity receives the message 3.

2408. The first ProSe entity sends a message 4 to the first terminal, where the message 4 carries the first code word.

2409. The first terminal receives the message 4.

2410. The first terminal broadcasts the first code word.

For a specific implementation manner of steps 2401 to 2410, reference may be made to related descriptions of corresponding steps in Embodiment 1, and details are not repeatedly described in this embodiment of the present disclosure.

Figure 25:
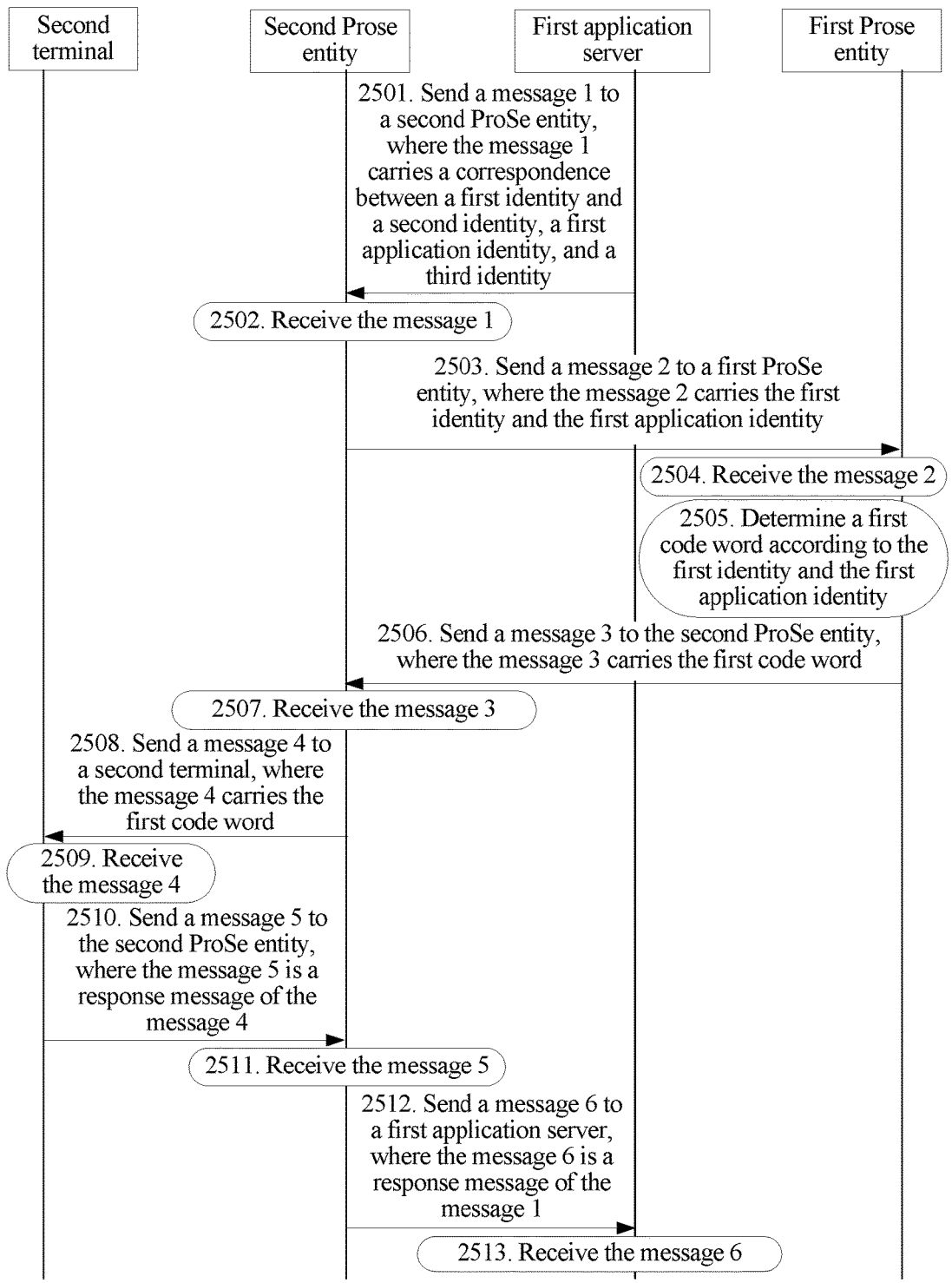
FIG. 25 is a schematic interworking diagram 10 of a ProSe information transmission method according to an embodiment of the present disclosure.

Optionally, as shown in FIG. 25, before that the second terminal acquires a first code word broadcast by the first terminal (step 2201), the ProSe information transmission method provided in this embodiment of the present disclosure may further include the following steps:

2501. The first application server sends a message 1 to the second ProSe entity, where the message 1 carries a correspondence between the first identity and the second identity, the first application identity, and a third identity.

2502. The second ProSe entity receives the message 1.

2503. The second ProSe entity sends a message 2 to the first ProSe entity, where the message 2 carries the first identity and the first application identity.

2504. The first ProSe entity receives the message 2.

2505. The first ProSe entity determines the first code word according to the first identity and the first application identity.

2506. The first ProSe entity sends a message 3 to the second ProSe entity, where the message 3 carries the first code word.

2507. The second ProSe entity receives the message 3.

2508. The second ProSe entity sends a message 4 to the second terminal, where the message 4 carries the first code word.

2509. The second terminal receives the message 4.

2510. The second terminal sends a message 5 to the second ProSe entity, where the message 5 is a response message of the message 4.

2511. The second ProSe entity receives the message 5.

2512. The second ProSe entity sends a message 6 to the first application server, where the message 6 is a response message of the message 1.

2513. The first application server receives the message 6.

For a specific implementation manner of steps 2501 to 2513, reference may be made to related descriptions of corresponding steps in Embodiment 1, and details are not repeatedly described in this embodiment of the present disclosure.

Figure 26:
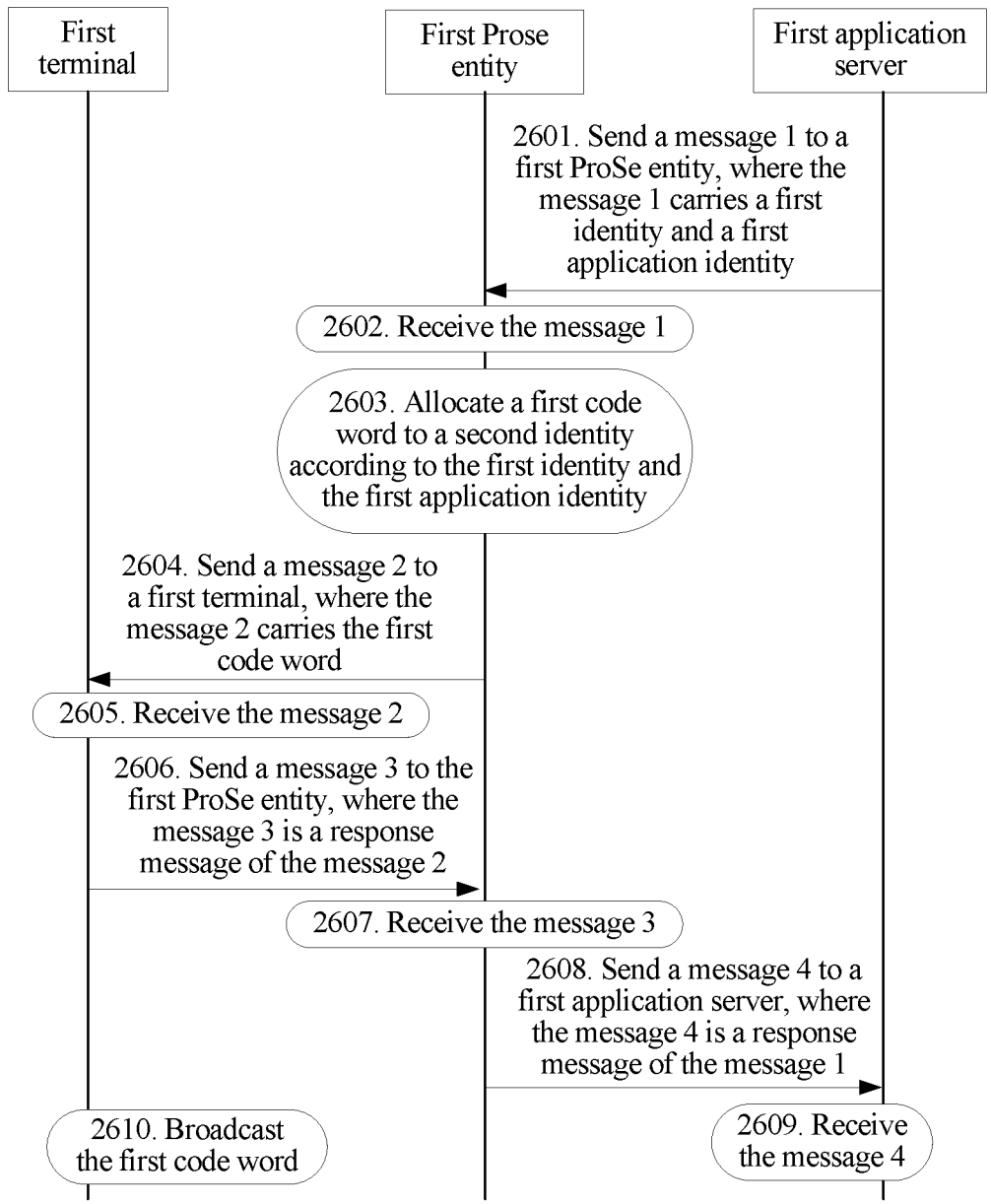
FIG. 26 is a schematic interworking diagram 11 of a ProSe information transmission method according to an embodiment of the present disclosure.

Further, as shown in FIG. 26, before that the second terminal acquires a first code word broadcast by the first terminal (step 2201), the ProSe information transmission method provided in this embodiment of the present disclosure may further include the following steps:

2601. The first application server sends a message 1 to the first ProSe entity, where the message 1 carries the first identity and the first application identity.

2602. The first ProSe entity receives the message 1.

2603. The first ProSe entity allocates the first code word to the second identity according to the first identity and the first application identity.

2604. The first ProSe entity sends a message 2 to the first terminal, where the message 2 carries the first code word.

2605. The first terminal receives the message 2.

2606. The first terminal sends a message 3 to the first ProSe entity, where the message 3 is a response message of the message 2.

2607. The first ProSe entity receives the message 3.

2608. The first ProSe entity sends a message 4 to the first application server, where the message 4 is a response message of the message 1.

2609. The first application server receives the message 4.

2610. The first terminal broadcasts the first code word.

It should be noted that there is no definite sequence between step 2610 and steps 2606 to 2609. Step 2610 may be performed before steps 2606 to 2609, or step 2610 may be performed after steps 2606 to 2609, which is not specifically limited in this embodiment of the present disclosure.

For a specific implementation manner of steps 2601 to 2610, reference may be made to related descriptions of corresponding steps in Embodiment 1, and details are not repeatedly described in this embodiment of the present disclosure.

This embodiment is a specific description of Embodiment 1; therefore, for technical effects that can be achieved in this embodiment, reference may be made to the foregoing descriptions, and details are not repeatedly described herein.

Embodiment 4

Figure 27:
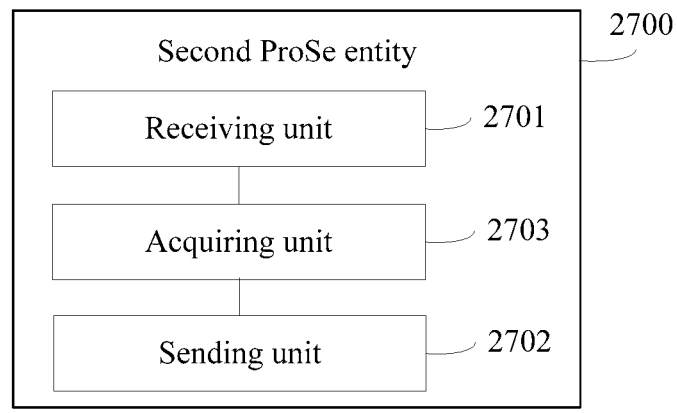
FIG. 27 is a schematic structural diagram 1 of a second ProSe entity according to an embodiment of the present disclosure.

This embodiment of the present disclosure provides a second ProSe entity 2700, which is specifically shown in FIG. 27. The second ProSe entity 2700 includes: a receiving unit 2701, a sending unit 2702, and an acquiring unit 2703.

The receiving unit 2701 is configured to receive a first message sent by a second terminal, where the first message is used to instruct the second ProSe entity 2700 to acquire a second identity.

The acquiring unit 2703 is configured to acquire the second identity.

The sending unit 2702 is configured to send a second message to the second terminal, where the second message carries the second identity.

The second identity is used to indicate a first application user discovered by the second terminal.

Optionally, the second message may further carry a first application identity, where the first application identity is an application identity of a first application, and the first application identity is used to indicate the first application corresponding to the second identity.

In a possible implementation manner, the first message carries a fourth code word and the first application identity.

The acquiring unit 2703 is specifically configured to:

send a third message to a first ProSe entity, where the third message carries the fourth code word and the first application identity, so that the first ProSe entity acquires the fourth code word and the second identity corresponding to the first application identity; and receive a fourth message sent by the first ProSe entity, where the fourth message carries the second identity.

Optionally, the fourth message may further carry the first application identity, where the first application identity is used to indicate the first application corresponding to the second identity.

Further, the receiving unit 2701 is further configured to: before receiving the first message sent by the second terminal, receive a fifth message sent by the second terminal, where the fifth message is used to instruct the second ProSe entity 2700 to acquire the fourth code word.

The acquiring unit 2703 is further configured to acquire the fourth code word.

The sending unit 2702 is further configured to send a sixth message to the second terminal, where the sixth message carries the fourth code word.

In a possible implementation manner, the fifth message carries a third identity and the first application identity.

The acquiring unit 2703 is specifically configured to:

send a seventh message to a first application server according to the first application identity, where the seventh message carries the third identity;

receive an eighth message sent by the first application server, where the eighth message carries a first identity, and the first identity is a temporary terminal identity that is allocated to a first terminal by the first ProSe entity;

send a ninth message to the first ProSe entity, where the ninth message carries the first identity; and receive a tenth message sent by the first ProSe entity, where the tenth message carries the fourth code word.

In another possible implementation manner, the fifth message carries first information, a fourth identity, and the first application identity, where the first information includes a third identity or a sixth identity.

The acquiring unit 2703 is specifically configured to:

send a seventh message to a first application server according to the first application identity, where the seventh message carries the fourth identity;

receive an eighth message sent by the first application server, where the eighth message carries a first identity, and the first identity is a temporary terminal identity that is allocated to a first terminal by the first ProSe entity;

send a ninth message to the first ProSe entity, where the ninth message carries the first identity; and receive a tenth message sent by the first ProSe entity, where the tenth message carries the fourth code word.

In a possible implementation manner, the first message may carry a first code word.

The acquiring unit 2703 is specifically configured to:

acquire the second identity according to the first code word.

Further, the sending unit 2702 is further configured to: before sending the second message to the second terminal, send a third message to a first application server, where the third message carries the second identity, and the second identity is a basis on which the first application server determines that an broadcast request of a first application user is allowed.

The receiving unit 2701 is further configured to receive a fourth message sent by the first application server, where the fourth message indicates that the broadcast request of the first application user is allowed.

Further, the sending unit 2702 is further configured to: after sending the second message to the second terminal, send a fifth message to a first ProSe entity, where the fifth message carries a first identity, the first application identity, and a fourth identity, the first identity is a temporary terminal identity that is allocated to the first terminal by the first ProSe entity, the first application identity is the application identity of the first application, the fourth identity is a temporary application user identity that is allocated to a second application user by the first application server, and the second application user is a user of the first application of the second terminal.

Figure 28:
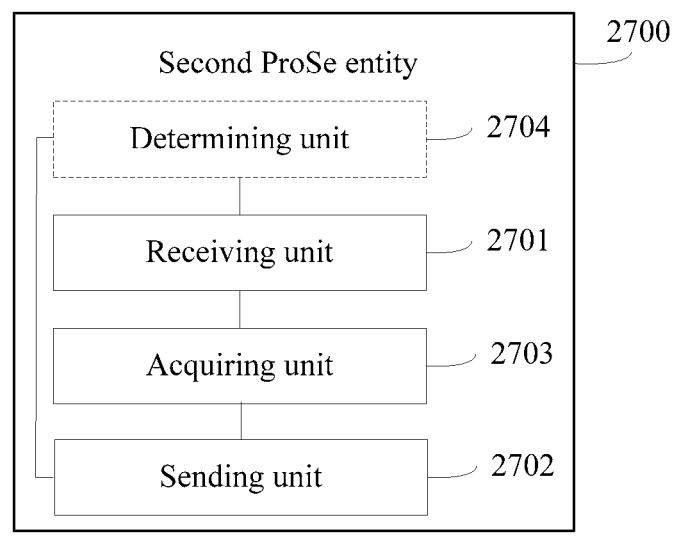
FIG. 28 is a schematic structural diagram 2 of a second ProSe entity according to an embodiment of the present disclosure.

Further, as shown in FIG. 28, the second ProSe entity further includes a determining unit 2704.

The receiving unit 2701 is further configured to: before receiving the first message, receive a sixth message sent by the second terminal, where the sixth message carries a third identity and the first application identity.

The determining unit 2704 is configured to determine the fourth identity according to the third identity and the first application identity.

The sending unit 2702 is further configured to send a seventh message to the first application server, where the seventh message carries the fourth identity.

The receiving unit 2701 is further configured to receive an eighth message sent by the first application server, where the eighth message carries a correspondence between the first identity and the second identity, and the correspondence between the first identity and the second identity is determined by the first application server according to the fourth identity.

The sending unit 2702 is further configured to send a ninth message to the first ProSe entity, where the ninth message carries the first identity and the first application identity.

The receiving unit 2701 is further configured to receive a tenth message sent by the first ProSe entity, where the tenth message carries the first code word, and the first code word is determined by the first ProSe entity according to the first identity and the first application identity.

The sending unit 2702 is further configured to send an eleventh message to the second terminal, where the eleventh message carries the first code word.

Optionally, the receiving unit 2701 is further configured to: before receiving the first message, receive a sixth message sent by the first application server, where the sixth message carries a correspondence between the first identity and the second identity, the first application identity, and a third identity.

The sending unit 2702 is further configured to send a seventh message to the first ProSe entity, where the seventh message carries the first identity and the first application identity.

The receiving unit 2701 is further configured to receive an eighth message sent by the first ProSe entity, where the eighth message carries the first code word, and the first code word is determined by the first ProSe entity according to the first identity and the first application identity.

The sending unit 2702 is further configured to send the ninth message to the second terminal, where the ninth message carries the first code word.

For related denotations of names such as the second ProSe entity, the first ProSe entity, the first terminal, the second terminal, the second identity, the first application user, the first application identity, the fourth code word, the third identity, the fourth identity, and the sixth identity in this embodiment of the present disclosure, reference may be made to the foregoing unified illustration part, and details are not repeatedly described in this embodiment of the present disclosure.

It should be noted that, among units and modules of the second ProSe entity 2700 provided in this embodiment of the present disclosure, the sending unit 2702 may be specifically implemented by using a transmitter; the receiving unit 2701 may be specifically implemented by using a receiver; the acquiring unit 2703 and the determining unit 2704 may be specifically implemented by using a processor, where the receiver, the processor, and the transmitter can communicate with each other, which is not specifically limited in this embodiment of the present disclosure.

Specifically, for a ProSe information transmission method performed by using the second ProSe entity 2700, reference may be made to descriptions of Embodiment 1 to Embodiment 3, which are not repeatedly described in this embodiment of the present disclosure.

The second ProSe entity in this embodiment can be used to perform the foregoing method; therefore, for technical effects that can be achieved by the second ProSe entity, reference may be made to a description in the foregoing embodiment, and details are not repeatedly described herein.

Embodiment 5

Figure 29:
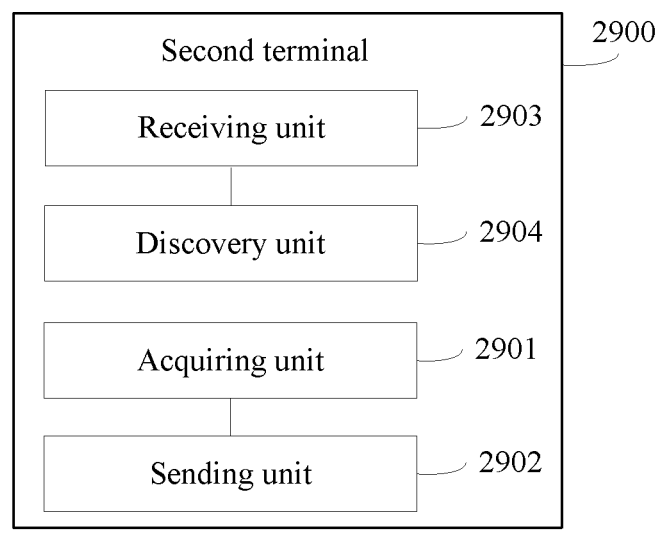
FIG. 29 is a schematic structural diagram of a second terminal according to an embodiment of the present disclosure.

This embodiment of the present disclosure provides a second terminal 2900, which is specifically shown in FIG. 29. The second terminal 2900 includes: an acquiring unit 2901, a sending unit 2902, a receiving unit 2903, and a discovery unit 2904.

The acquiring unit 2901 is configured to acquire a fourth code word broadcast by a first terminal.

The sending unit 2902 is configured to send a first message to a second ProSe entity when the fourth code word matches a prestored code word, where the first message carries the fourth code word and a first application identity.

The receiving unit 2903 is configured to receive a second message sent by the second ProSe entity, where the second message carries a second identity.

The second identity is used to indicate a first application user discovered by the second terminal.

The discovery unit 2904 is configured to discover the first application user according to the second identity.

That is, the discovery unit 2904 is configured to confirm, according to the second identity, that the first application user is near the second terminal.

Optionally, the second message may further carry the first application identity, where the first application identity is used to indicate the first application corresponding to the second identity.

Further, the sending unit 2902 is further configured to send a third message to the second ProSe entity when the fourth code word matches the prestored code word and before the acquiring unit 2901 acquires the fourth code word broadcast by the first terminal, where the third message carries a third identity and the first application identity.

The receiving unit 2903 is further configured to receive a fourth message sent by the second ProSe entity, where the fourth message carries the fourth code word.

Optionally, the sending unit 2902 is further configured to send a third message to the second ProSe entity when the fourth code word matches the prestored code word and before the acquiring unit 2901 acquires the fourth code word broadcast by the first terminal, where the third message carries first information, a fourth identity, and the first application identity, and the first information includes a third identity or a sixth identity.

The receiving unit 2903 is further configured to receive a fourth message sent by the second ProSe entity, where the fourth message carries the fourth code word.

For related denotations of names such as the first terminal, the second terminal, the fourth code word, the first application identity, the second ProSe entity, the second identity, the first application user, and the third identity in this embodiment of the present disclosure, reference may be made to the foregoing unified illustration part, and details are not repeatedly described in this embodiment of the present disclosure.

It should be noted that, among units and modules of the second terminal 2900 provided in this embodiment of the present disclosure, the acquiring unit 2901 and the discovery unit 2904 may be specifically implemented by using a processor; the sending unit 2902 may be specifically implemented by using a transmitter; the receiving unit 2903 may be specifically implemented by using a receiver, where the processor, the receiver, and the transmitter can communicate with each other, which is not specifically limited in this embodiment of the present disclosure.

Specifically, for a ProSe information transmission method performed by using the second terminal 2900, reference may be made to a description of Embodiment 1 or Embodiment 2, which are not repeatedly described in this embodiment of the present disclosure.

The second terminal in this embodiment can be used to perform the foregoing method; therefore, for technical effects that can be achieved by the second terminal, reference may be made to a description in the foregoing embodiment, and details are not repeatedly described herein.

Embodiment 6

This embodiment of the present disclosure provides a second terminal 3000, which is specifically shown in FIG. 30. The second terminal 3000 includes an acquiring unit 3001, a sending unit 3002, and a receiving unit 3003.

The acquiring unit 3001 is configured to acquire a first code word broadcast by a first terminal.

The sending unit 3002 is configured to send a first message to a second ProSe entity when the first code word matches a prestored code word, where the first message carries the first code word.

The receiving unit 3003 is configured to receive a second message sent by the second ProSe entity, where the second message carries a second identity, the second identity is determined by the second ProSe entity according to the first code word, and the second identity is used to instruct to discover a first application user.

Further, the sending unit 3002 is further configured to: when the first code word matches the prestored code word, and before the acquiring unit 3001 acquires the first code word broadcast by the first terminal, send a third message to the second ProSe entity, where the third message carries a third identity and a first application identity.

The receiving unit 3003 is further configured to receive a fourth message sent by the second ProSe entity, where the fourth message carries the first code word, and the first code word is determined by the second ProSe entity according to the third identity and the first application identity.

Optionally, the receiving unit 3003 is further configured to: before the acquiring unit 3001 acquires the first code word, when an application server is triggered, receive a third message sent by the second ProSe entity, where the third message carries the first code word.

Further, the sending unit 3002 is further configured to: after the receiving unit 3003 receives the third message sent by the second ProSe entity, send a fourth message to the second ProSe entity, where the fourth message is a response message of the third message.

It should be noted that, among units and modules of the second terminal 3000 provided in this embodiment of the present disclosure, the acquiring unit 3001 may be specifically implemented by using a processor; the sending unit 3002 may be specifically implemented by using a transmitter; the receiving unit 3003 may be specifically implemented by using a receiver, where the processor, the receiver, and the transmitter can communicate with each other, which is not specifically limited in this embodiment of the present disclosure.

Specifically, for a ProSe information transmission method performed by using the second terminal 3000, reference may be made to a description of Embodiment 1 or Embodiment 3, which are not repeatedly described in this embodiment of the present disclosure.

The second terminal in this embodiment can be used to perform the foregoing method; therefore, for technical effects that can be achieved by the second terminal, reference may be made to a description in the foregoing embodiment, and details are not repeatedly described herein.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A proximity service (ProSe) information transmission method, wherein the method comprises:
   receiving, by a receiving ProSe entity, a first message sent by a monitoring terminal, the first message instructing the receiving ProSe entity to acquire a first application user identity that is allocated to a first application user by a first application server, the first application user being a user of a first application of a first terminal, the first message comprising a code word allocated by a first ProSe entity, the first application server being an application server of the first application, and the receiving ProSe entity being a ProSe entity in a first home public land mobile network (HPLMN) of the monitoring terminal;
   acquiring, by the receiving ProSe entity, the first application user identity by, sending to the first ProSe entity the code word received in the first message, and in response, receiving from the first ProSe entity the first application user identity,
   wherein the first ProSe entity is in a second HPLMN of the first terminal, the code word being related to a plurality of application user identities including the first application user identity, and the second HPLMN being a different HPLMN than the first HPLMN; and
   sending, by the receiving ProSe entity, a second message to the monitoring terminal, the second message comprising the first application user identity received from the first ProSe entity, the first application user identity indicating the first application user discovered by the monitoring terminal.

2. The method according to claim 1, wherein the first application user identity comprises a temporary application user identity (Temp APP User ID) or a real application user identity allocated by the application server.

3. The method according to claim 1, further comprising:
   before receiving the first message sent by the monitoring terminal, receiving, by the receiving ProSe entity, a fifth message sent by the monitoring terminal, the fifth message instructing the receiving ProSe entity to acquire the code word allocated to the first terminal by the first ProSe entity;

acquiring, by the receiving ProSe entity, the code word; and sending, by the receiving ProSe entity, a sixth message to the monitoring terminal, wherein the sixth message comprises the code word.

4. The method according to claim 3, wherein the fifth message comprises a third identity and the application identity, the third identity comprising a temporary terminal identity allocated to the monitoring terminal by the receiving ProSe entity, and the application identity identifying the first application; and acquiring the code word comprises:
sending, by the receiving ProSe entity, a seventh message to the first application server according to the application identity, wherein the seventh message comprises the third identity;
receiving, by the receiving ProSe entity, an eighth message sent by the first application server, the eighth message comprising a first identity, the first identity comprising a temporary terminal identity allocated to the first terminal by the first ProSe entity;
sending, by the receiving ProSe entity, a ninth message to the first ProSe entity, the ninth message comprising the first identity; and
receiving, by the receiving ProSe entity, a tenth message sent by the first ProSe entity, the tenth message comprising the code word.

5. The method according to claim 3, wherein the fifth message comprises first information, a fourth identity, and the application identity, the first information comprising a third identity or a sixth identity, the third identity comprising a temporary terminal identity allocated to the monitoring terminal by the receiving ProSe entity, the sixth identity comprising a terminal identity of the monitoring terminal, the fourth identity comprising a temporary application user identity allocated to a second application user by the first application server, the second application user being a user of the first application of the monitoring terminal, and the application identity being the application identity of the first application; and acquiring the code word comprises:
sending, by the receiving ProSe entity, a seventh message to the first application server according to the application identity, the seventh message comprising the fourth identity;
receiving, by the receiving ProSe entity, an eighth message sent by the first application server, the eighth message comprising a first identity, the first identity comprising a temporary terminal identity allocated to the first terminal by the first ProSe entity;
sending, by the receiving ProSe entity, a ninth message to the first ProSe entity, the ninth message comprising the first identity; and
receiving, by the receiving ProSe entity, a tenth message sent by the first ProSe entity, the tenth message comprising the code word.

6. The method according to claim 1, further comprising:
before sending the second message to the monitoring terminal, sending, by the receiving ProSe entity, a third message to the first application server, the third message comprising the first application user identity, the first application user identity configured to cause the first application server to determine whether a broadcast request of the first application user is allowed; and receiving, by the receiving ProSe entity, a fourth message sent by the first application server, the fourth message indicating whether the broadcast request of the first application user is allowed.

7. The method according to claim 6, further comprising:
after sending the second message to the monitoring terminal, sending, by the receiving ProSe entity, a fifth message to the first ProSe entity, the fifth message comprising a first identity, the application identity, and a fourth identity, the first identity comprising a temporary terminal identity allocated to the first terminal by the first ProSe entity, the application identity identifying the first application, the fourth identity comprising a temporary application user identity allocated to a second application user by the first application server, the second application user being a user of the first application of the monitoring terminal.

8. The method according to claim 1, further comprising:
before receiving the first message, receiving, by the receiving ProSe entity, a sixth message sent by the monitoring terminal, the sixth message comprising a third identity and the application identity, the third identity comprising a temporary terminal identity allocated to the monitoring terminal by the receiving ProSe entity, and the application identity identifying the first application;

determining, by the receiving ProSe entity, a fourth identity according to the third identity and the application identity, the fourth identity comprising a temporary application user identity allocated to a second application user by the first application server, the second application user being the user of the first application of the monitoring terminal;

sending, by the receiving ProSe entity, a seventh message to the first application server, the seventh message comprising the fourth identity;

receiving, by the receiving ProSe entity, an eighth message sent by the first application server, the eighth message comprising a correspondence between the first identity and the first application user identity, the correspondence between the first identity and the first application user identity being determined by the first application server according to the fourth identity, the first identity comprising the temporary terminal identity allocated to the first terminal by the first ProSe entity;

sending, by the receiving ProSe entity, a ninth message to the first ProSe entity, the ninth message comprising the first identity and the application identity;

receiving, by the receiving ProSe entity, a tenth message sent by the first ProSe entity, the tenth message comprising the code word, the code word being determined by the first ProSe entity according to the first identity and the application identity; and sending, by the receiving ProSe entity, an eleventh message to the monitoring terminal, wherein the eleventh message comprises the code word.

9. The method according to claim 1, further comprising:
before receiving, by the receiving ProSe entity, the first message, receiving, by the receiving ProSe entity, a sixth message sent by the first application server, the sixth message comprising a correspondence between the first identity and the first application user identity, the application identity, and a third identity, the first identity comprising a temporary terminal identity allocated to the first terminal by the first ProSe entity, the application identity identifying the first application, and the third identity comprising a temporary terminal identity allocated to the monitoring terminal by the receiving ProSe entity;

sending, by the receiving ProSe entity, a seventh message to the first ProSe entity, the seventh message comprising the first identity and the application identity;

receiving, by the receiving ProSe entity, an eighth message sent by the first ProSe entity, the eighth message comprising the code word, the code word being determined by the first ProSe entity according to the first identity and the application identity; and sending, by the receiving ProSe entity, a ninth message to the monitoring terminal, the ninth message comprising the code word.

10. A proximity service ProSe information transmission method, wherein the method comprises:

receiving, by a monitoring terminal from a first terminal, a code word; and discovering, by the monitoring terminal, a first application user according to a first application user identity by:

sending, by the monitoring terminal, a first message to a receiving ProSe entity when the received code word matches a prestored code word, the first message instructing the receiving ProSe entity to acquire the first application user identity that is allocated to the first application user by a first application server, the first application user being a user of a first application of a first terminal, the first application server being an application server of the first application, the first message comprising the received code word allocated by a first ProSe entity, the receiving ProSe entity being a ProSe entity in a first home public land mobile network (HPLMN) of the monitoring terminal;

receiving, by the monitoring terminal, a second message sent by the receiving ProSe entity, the second message comprising a first application user identity, the first application user identity being sent to the receiving ProSe entity by a first ProSe entity after the first ProSe entity receives the code word sent by the receiving ProSe entity, wherein the first ProSe entity is in a second HPLMN of the first terminal, the code word being related to a plurality of application user identities including the first application user identity, and the second HPLMN being a different HPLMN than the first HPLMN.

11. The method according to claim 10, wherein the first application user identity comprises a temporary application user identity (Temp APP User ID) or a real application user identity allocated by the application server.

12. The method according to claim 10, the method further comprising:

acquiring, by the monitoring terminal, the code word when the first terminal is broadcasting the code word, wherein the first message comprising the code word and a first application identity, the first application identity identifying a first application corresponding to the first application user identity, and the second message further comprises the first application identity.

13. The method according to claim 10, further comprising:

sending, by the monitoring terminal, a third message to the receiving ProSe entity, the third message comprising a third identity and a first application identity, the third identity comprising a temporary terminal identity allocated to the monitoring terminal by the receiving ProSe entity;

receiving, by the monitoring terminal, a fourth message sent by the receiving ProSe entity, the fourth message comprising a code word for prestoring; and acquiring, by the monitoring terminal, the code word when the first terminal is broadcasting the code word;

wherein the first message comprises the code word and is sent when the code word matches the code word for prestoring.

14. The method according to claim 10, further comprising:

sending, by the monitoring terminal, a third message to the receiving ProSe entity, the third message comprising first information, a fourth identity, and a first application identity, the first information comprising a third identity or a sixth identity, the third identity comprising a temporary terminal identity allocated to the monitoring terminal by the receiving ProSe entity, the sixth identity identifying the monitoring terminal, the fourth identity comprising a temporary application user identity allocated to a second application user by the first application server, the second application user being a user of the first application of the monitoring terminal;

receiving, by the monitoring terminal, a fourth message sent by the receiving ProSe entity, wherein the fourth message comprising a code word for prestoring; and acquiring, by the monitoring terminal, the code word when the first terminal is broadcasting the code word;

wherein the first message comprises the code word and is sent when the code word matches the code word for prestoring.

15. A receiving ProSe entity, comprising: a receiver, a transmitter, a processor, and an acquiring circuit; wherein:

the receiver is configured to receive a first message sent by a monitoring terminal, the first message being used to instruct the receiving ProSe entity to acquire a first application user identity that is allocated to a first application user by a first application server, the first application user being a user of a first application of a first terminal, the first message comprising a code word allocated by a first ProSe entity, the first application server being an application server of the first application, and the receiving ProSe entity being a ProSe entity in a first home public land mobile network (HPLMN) of the monitoring terminal;

the acquiring circuit is configured to acquire the first application user identity by, sending by the processor to the first ProSe entity the code word received by the receiver in the first message, and in response, receiving by the processor from the first ProSe entity the first application user identity, wherein the first ProSe entity is in a second HPLMN of the first terminal, the code word being related to a plurality of application user identities including the first application user identity, and the second HPLMN being a different HPLMN than the first HPLMN; and the transmitter is configured to send a second message to the monitoring terminal, the second message comprising the first application user identity received by the acquiring circuit.

16. The receiving ProSe entity according to claim 15, wherein the first application user identity comprises a temporary application user identity (Temp APP User ID) or a real application user identity allocated by the application server.

* * * * *